United States Patent [19]

Lindsey et al.

[11] Patent Number: 5,285,383
[45] Date of Patent: Feb. 8, 1994

[54] METHOD FOR CARRYING OUT TRANSACTIONS OF GOODS USING ELECTRONIC TITLE

[75] Inventors: James D. Lindsey; Charles D. Hutton; Joe W. Tubb; Carol L. Shipman; Albert S. Kyle, III, all of Lubbock, Tex.

[73] Assignee: Plains Cotton Cooperative Association, Lubbock, Tex.

[21] Appl. No.: 777,681

[22] Filed: Oct. 15, 1991

Related U.S. Application Data

[63] Continuation-in-part of Ser. No. 582,551, Sep. 14, 1990, Pat. No. 5,063,507.

[51] Int. Cl.⁵ .................. G06F 15/20; G06F 15/22
[52] U.S. Cl. ........................ 364/408; 364/401
[58] Field of Search ............ 364/401, 403, 408; 340/825.35; 235/383, 385

[56] References Cited

U.S. PATENT DOCUMENTS

| | | | |
|---|---|---|---|
| 4,115,870 | 9/1978 | Lowell | 364/900 |
| 4,346,442 | 8/1982 | Musmanno | 364/408 |
| 4,454,414 | 6/1984 | Benton | 235/379 |
| 4,456,790 | 6/1984 | Soyack | 179/18 ES |
| 4,591,705 | 5/1986 | Toudou | 235/381 |
| 4,751,640 | 6/1988 | Lucas et al. | 364/408 |
| 4,783,655 | 11/1988 | Cobb et al. | 340/825.49 |
| 4,799,156 | 1/1989 | Shavit et al. | 364/401 |
| 4,819,162 | 4/1989 | Webb, Jr. et al. | 364/401 |
| 4,878,771 | 11/1989 | Nishida | 400/70 |
| 4,896,791 | 1/1990 | Smith | 221/7 |
| 4,903,201 | 2/1990 | Wagner | 364/408 |
| 4,910,676 | 3/1990 | Alldredge | 364/408 |
| 4,920,488 | 4/1990 | Filley | 364/403 |
| 4,953,085 | 8/1990 | Atkins | 364/408 |
| 4,989,144 | 1/1991 | Barnett, III | 364/419 |

FOREIGN PATENT DOCUMENTS 2017546 3/1970 Fed. Rep. of Germany.
50-138359 5/1977 Japan.

OTHER PUBLICATIONS

Business Software Database Abstracts (undated).
Baker, M. V., "Electronic Title—The Alternative to Share Certificates".

*Primary Examiner*—Roy N. Envall, Jr.
*Assistant Examiner*—Khai Tran
*Attorney, Agent, or Firm*—Richards, Medlock & Andrews

[57] ABSTRACT

A commodity trading system having a centralized computer and data base. Each commodity, such as a bale of cotton, or a block of bales, is represented in the data base as a file having all the information unique to such bale, including a title flag. The title flag field of bale record and block record indicates whether the title to the cotton bale, or block of bales, is carried by way of a card-type warehouse receipt, or electronically. The electronic representation of title eliminates the transferral of documentary type title which is traditionally mailed to various locations to follow the trading transactions.

27 Claims, 7 Drawing Sheets

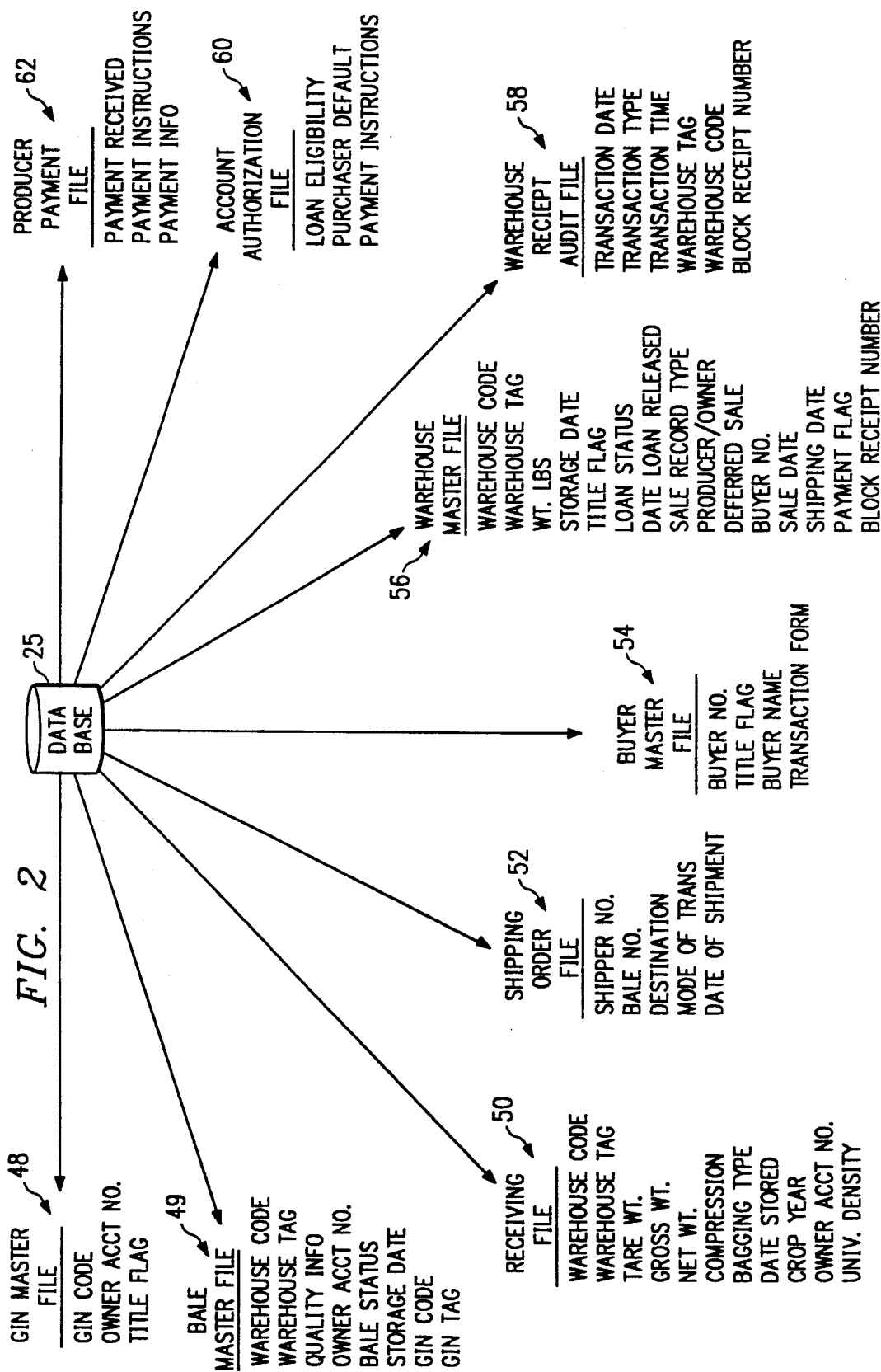

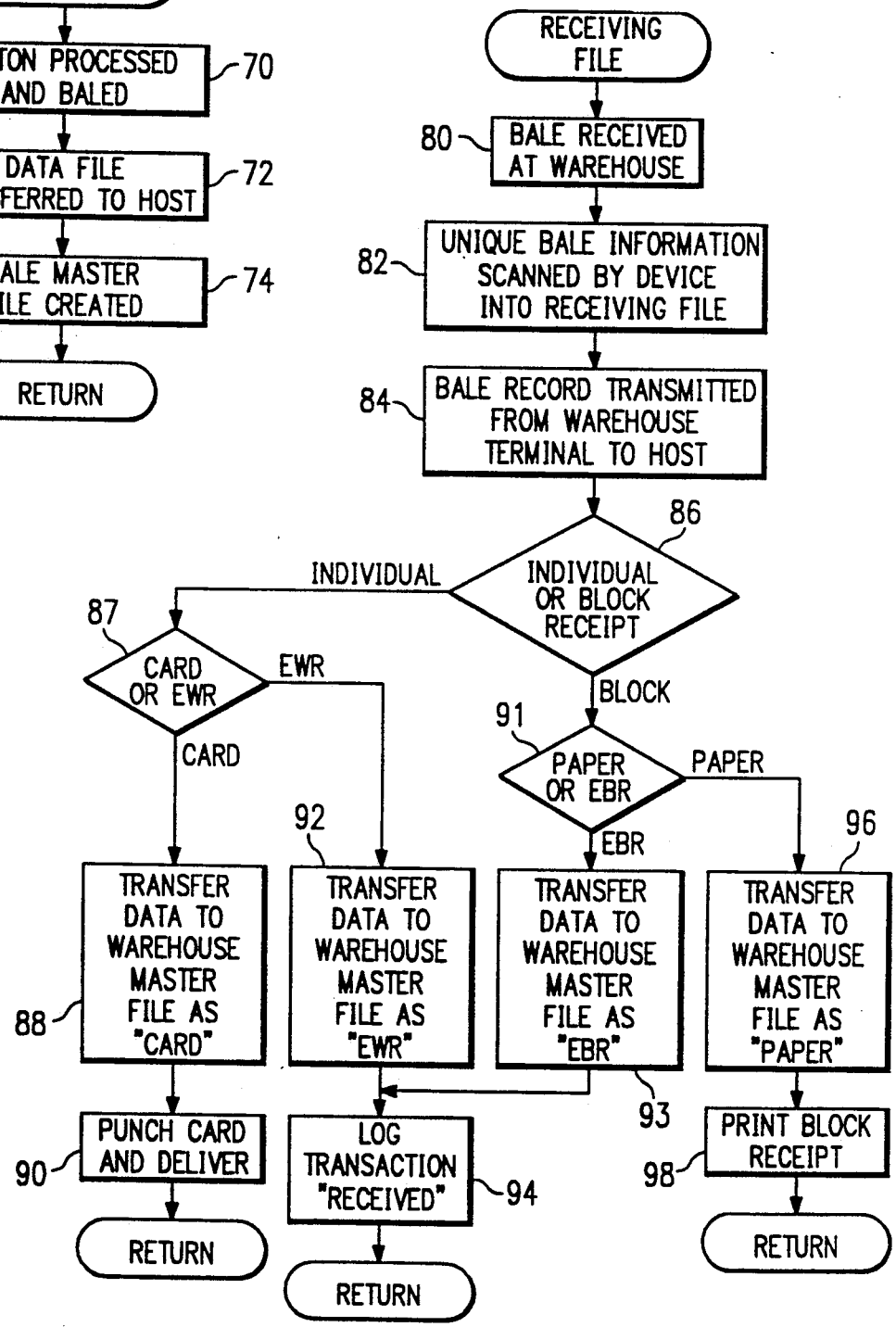

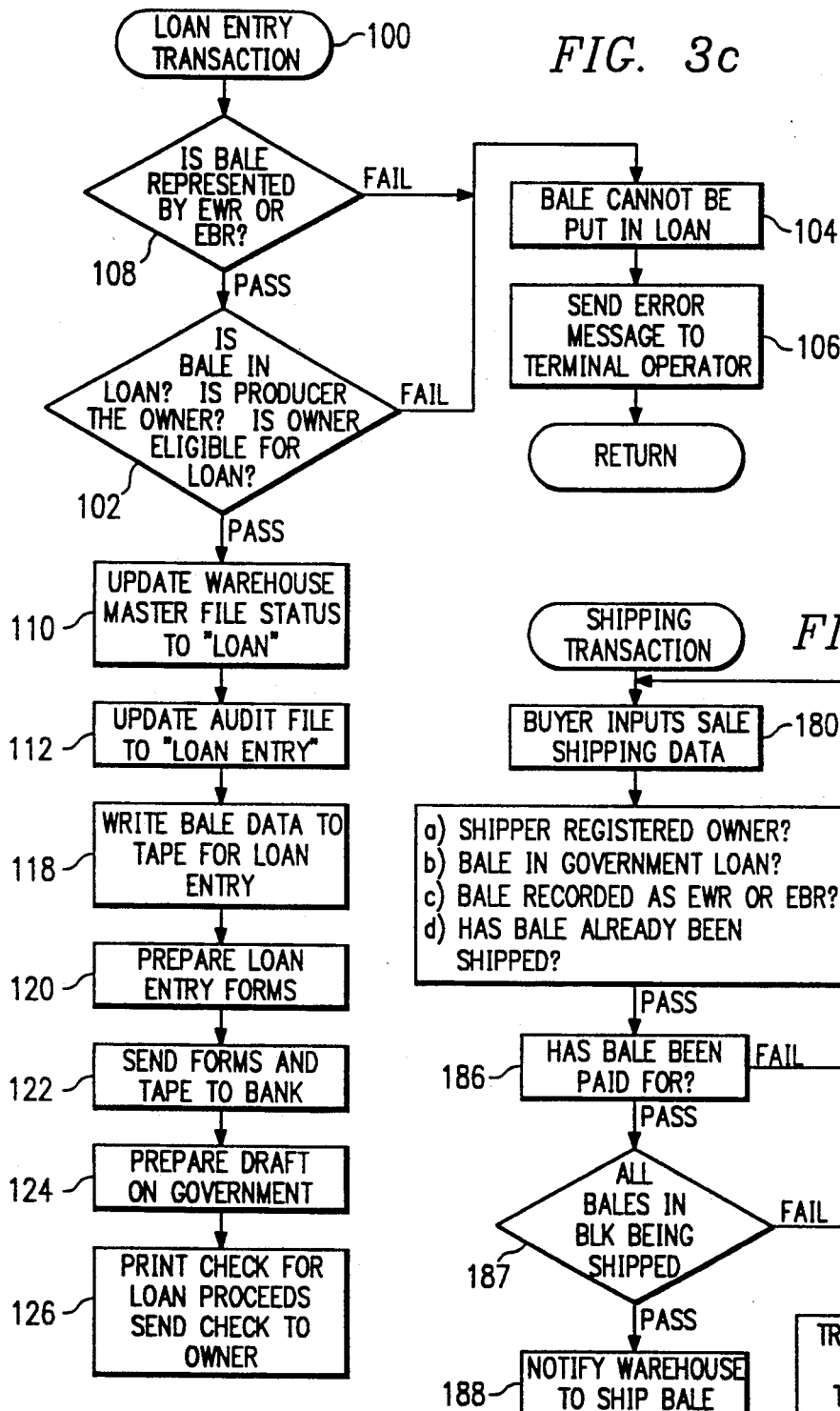

METHOD FOR CARRYING OUT TRANSACTIONS OF GOODS USING ELECTRONIC TITLE

This application is a continuation-in-part of application Ser. No. 582,551 filed Sep. 14, 1990, now U.S. Pat. No. 5,063,507.

TECHNICAL FIELD

The present invention relates in general to systems for assigning and transferring title to goods, and more particularly to a technique for assigning an electronic warehouse receipt to commodity goods.

BACKGROUND OF THE INVENTION

Many natural resources and goods undergo numerous trading transactions from the initial harvesting, manufacturing, etc. stage until the time such goods or commodities are integrated into a final product. Many of these goods or commodities are unique within themselves, and thus carry an identity throughout the trading process. Cotton is one such commodity which, when compressed into a bale, has a certain quality, weight, etc. such that it maintains an individual identity throughout the trading process, until woven into a fabric, or otherwise used by the textile industry. A warehouse receipt is initially associated with each bale, which receipt is evidence of title to the goods throughout the various trading transactions. Other types of goods such as grain, are similarly represented by warehouse receipts, or other evidences of title. As other examples, many types of personal property, such as automobiles, are bought and sold using a documentary type of title.

When trading commodities, as perhaps other types of goods, a group or lot of the commodities can be collectively traded together and thus be represented by a single document that evidences title to the entire group. In this situation, the number of documents evidencing title is reduced, as a single document represents title to the entire group, however, such type of title is yet susceptible to loss, damage or theft. In the cotton trading industry, a block warehouse receipt is utilized in many trading transactions for the entire group of bales. The block warehouse receipt, comprising a single document, includes a listing thereon of the warehouse receipt number of each of the individual bales. Under this system, the entire group of cotton bales must be traded together.

The documentary form of title, whether individual or by blocks, is one of the oldest and most well known types of title systems. The problems involved in buying, selling or otherwise trading such titled goods are apparent. For example, the documentary form of title is usually guarded by storing it in a safe place. When dealing in large quantities of such goods, the space required can be substantial. In addition, in the actual trading transaction, the title documents must be physically exchanged between the buyer and seller, which exchange generally involves mailing the documents from the seller to the buyer. In such transactions, it is obvious that the documents themselves can be lost, damaged or stolen. Importantly, and especially with the warehouse type of receipts, such documents are bearer documents in which the holder, even a wrongful holder, can sell the goods, or carry out a trading transaction involving the goods. Other disadvantages of the document title system are apparent, in that the documents themselves can be wrongfully modified or changed, can be forged, or illegal title documents can be generated.

From the foregoing, it can be seen that a need exists for an improved title system which overcomes the foregoing problems. A further need exists for a title system which is electronic in nature, and which is easily implementable with other computerized trading systems. Yet another need exists for a system which can accommodate electronic titling, as well as the documentary form of title. An additional need exists for a computerized trading system that can accommodate the individual titling of goods as well as the block titling of goods.

SUMMARY OF THE INVENTION

According to the invention, an electronic title system is disclosed in which title to the commodity or goods is represented in a nondocumentary form, and is adapted for electronic transfer in a computerized trading system.

In accordance with the preferred embodiment of the invention, the trading of baled cotton is carried out in a computerized trading system by denoting in the computer data base, at the option of the producer or trader, whether the commodity is to be titled by a physical warehouse receipt, or electronically. More particularly, when harvested cotton is compressed into a bale at a gin, a gin clerk communicates via a terminal with a centralized data base pertinent data about the bale of cotton. The gin clerk enters into the centralized data base information that is unique to each bale, including a gin code identifying the particular gin, a gin tag identifying the particular bale, and data indicating whether or not the producer desires to assign either electronic title to the bale, or a warehouse receipt type of title. When a cotton bale, or a number of bales comprising a lot, are transferred to a warehouse, yet other information is entered by way of warehouse computer terminals into the centralized data base to complete the information unique to each bale. Various files in the centralized data base include a field which is flagged to indicate that the particular cotton bale is represented either electronically, or by a documentary type title. All trading of the baled cotton is carried out via the centralized computer, using various data bases and files to check and cross-check the information concerning the trading transactions and to verify that such transaction can indeed be completed. When the baled cotton is represented by an electronic title, numerous trading transactions can be carried in the centralized computer trading system without having to actually transfer any documentary evidence of title.

In accordance with another feature of the invention, a group of the individual goods can be collectively represented by an electronic title, such as an electronic warehouse receipt. When a producer desires to characterize his or her commodity in terms of groups or blocks, such an indication is input into the trading system of the invention. For each block of the commodity, a new block record is generated, with a field indicating whether the block is to be represented by a documentary warehouse receipt or an electronic warehouse receipt. In addition, the computer record of each individual commodity is marked to identify the particular block to which it belongs. In this manner, each commodity is completely characterized in the computer data base as to whether it has individual or block association, and the type of warehouse receipt associated therewith. In carrying out a trading transaction involving a block of the commodity, the computerized trading system assures that all the individual commodities traded comply with the requirements of the block. For example, every individual commodity traded in a block must be represented by either a documentary or electronic warehouse receipt, and all must be traded together as a block.

It can be appreciated that an important technical advantage of the invention is that the speed of the overall trading process can be enhanced, as no title documents need to be physically transferred between the trading parties. Another technical advantage is that since no title documents are involved, the incidences due to theft, loss, and damage are essentially eliminated.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same or similar elements throughout the views, and in which:

FIG. 2 is a block diagram of the numerous data bases utilized by the computerized trading system for electronically trading goods which are titled either electronically or by title documents; and FIGS. 3A-3G are flow charts illustrating the various operations carried out by the trading system.

DETAILED DESCRIPTION OF THE INVENTION

Centralized Computer System

Figure 1:
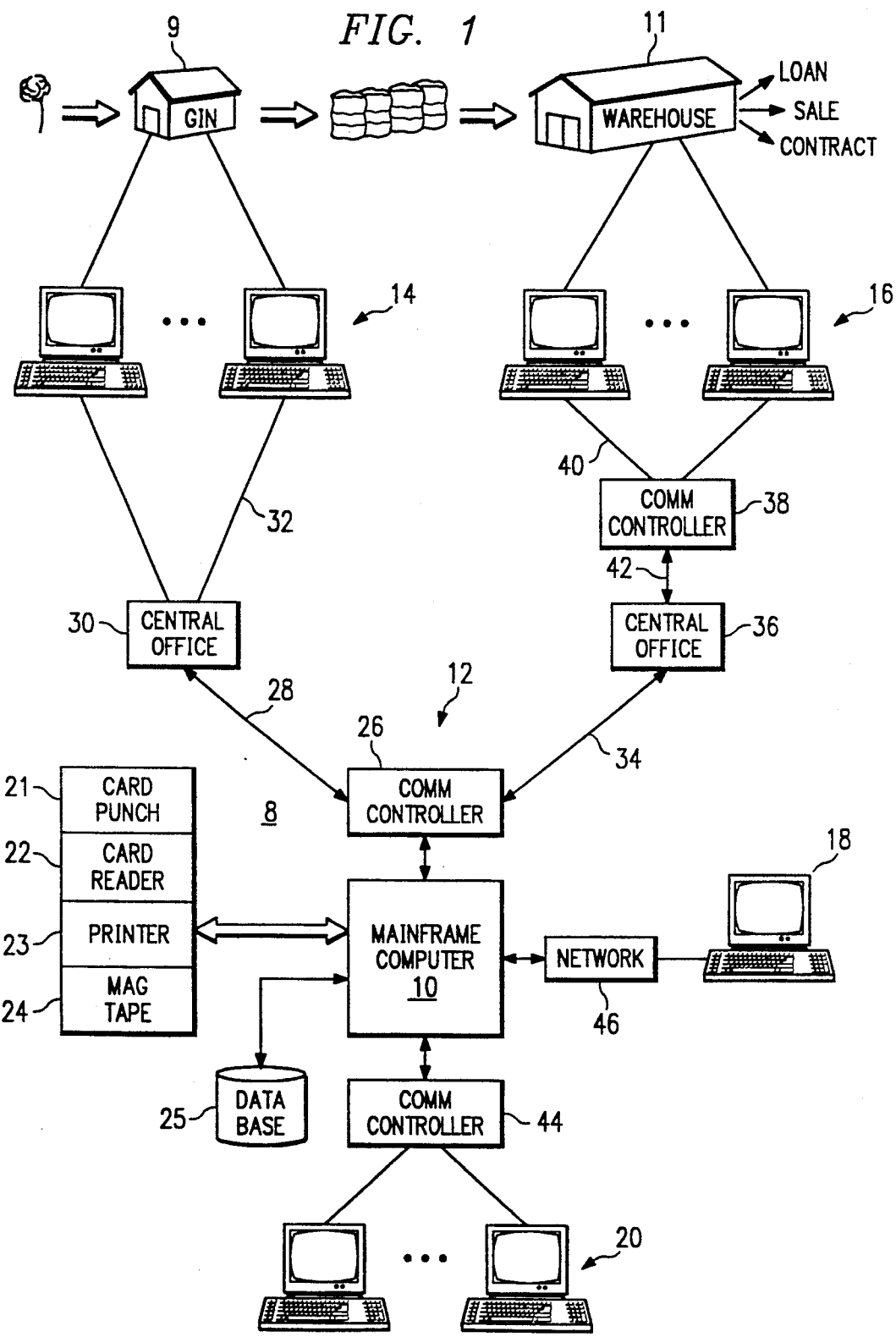
FIG. 1 is a generalized diagram of a centralized commodity trading system embodying the invention.

FIG. 1 shows a centralized computer trading system 8 in which the invention has been advantageously practiced. The invention is described in connection with the preferred embodiment, that is, the trading of the cotton commodity and the use of an electronic warehouse receipt to simplify and expedite the trading operations. It is to be understood, however, that the principles and concepts of the invention can be utilized in other environments, and are not thereby limited to commodities or the equipment shown. The invention is applicable to other commodities such as grain, lumber, etc. According to the preferred form of the invention, a program-controlled mainframe computer 10 is connected by a network 12 to remotely located cotton gins 9 and warehouses 11, each having respective computer terminals 14 and 16. While a single gin and warehouse are shown, many are typically used in such a trading system. The mainframe computer 10 is also connected through the same or other types of networks to commodity buyer terminals 18. Other on-premises computer terminals 20 are connected to the mainframe computer 10 to enter data by local operators. In order to carry out cotton trading transactions, a card punch machine 21 is connected to the mainframe computer 10, as is a card reader 22, a printer 23, and a magnetic tape machine 24.

In practice, the computer 10 comprises an IBM 3090 mainframe, programmed with COBOL instructions to carry out both the trading transactions, as well as the electronic title technique of the invention. The overall network is of an IBM SNA type architecture for providing the bidirectional transmission of data between the various terminals and the mainframe computer 10. The network 12 comprises an IBM 3725 communications controller 26 connected to I/O ports of the mainframe computer 10. The communication controller 26 is connected by telephone lines or trunks 28 to the public telephone system, shown as a central office 30. Leased subscriber lines 32 connect the terminals to the gin 9. In practice, many gins can be connected in like manner to the mainframe computer 10. Each gin terminal 14 comprises an IBM PS/2 Model 70 personal computer with a telephone line modem (not shown) for communicating cotton bale data to a data base storage unit 25 of the mainframe computer 10. The type and manner in which cotton bale data is communicated between the gin 9 and the mainframe computer 10 is described in more detail below.

Other telephone trunks 34 connected to a public telephone system central office 36 are effective to communicate data between the mainframe computer 10 and the terminals 16 associated with the respective warehouses 11. Each terminal 16 associated with a warehouse 11 is connected to a communication controller 38 by respective computer lines 40. The communication controller 38 is an IBM type 3274 for providing duplex data communications between the warehouse terminals 16 and the single telephone line 42 extended to the central office 36. It should be noted that the commodity trading system 8 shown in FIG. 1 is a real-time operating system in which all remotely located terminals can communicate concurrently with the data base 25 of the mainframe computer 10.

As with the warehouse terminals 16, the local terminals 20 are of the IBM 3270 type, connected through a type 3274 communication controller 44 to the mainframe computer 10. Each communication controller 44 can accommodate thirty-two local terminals 20. In the preferred form of the invention, there are six such controllers 44 operable to communicate data between the mainframe computer 10 and 192 local terminals 20 The buyers terminal 18 comprise PS/2, Model 50 personal computers which communicate through radio, satellite or other types of networks 46 to the mainframe computer 10. The card punch 21 and reader 22 are of the standard type for reading or punching 80-column computer cards As will be described in more detail below, when it is desired to represent a cotton bale with a documentary type of title, the card punch 21 is effective to punch a warehouse receipt which uniquely identifies a bale of cotton. The printer 23 is of a conventional type effective to print computer records, reports or other documents pertaining to the commodity trading transactions.

A cotton trading system as characterized in FIG. 1 has been successfully utilized as a central clearing house for providing a coordinated interaction between the various gins, warehouses and buyers to achieve an effective and efficient cotton trading program. As noted above, before the utilization of the electronic title system of the invention, title documents in the nature of card-type warehouse receipts were employed as evidence of ownership of the baled cotton. Routine well-known cotton trading transactions were carried out in the following manner. Cotton harvested by a producer was processed at the gin 9 and compressed into baled form. After the compress operation, each bale was ticketed with a tag having a gin code, identifying the particular gin, and a gin tag number which identified the particular bale. Such ticket also included an identification of the cotton producer, such as an account number. This information was input into the gin terminal 14 and transferred via the network 12 to the centralized data base 25. Next, the bale was transported to a warehouse 11 for storage. At the warehouse 11, another ticket was attached to the bale with yet other identifying information. The warehouse ticket included a warehouse code identifying the particular warehouse, as well as a warehouse tag number identifying the particular bale. Each bale was weighed to define a tare weight, a gross weight, and a net weight. The type of compression is further noted on the warehouse ticket, as well as bagging information, and the date the bale was stored. A sample from each cotton bale was sent to the U.S.D.A. classing office for analysis to establish the quality. The noted information was all represented on the ticket by bar code labels. At the warehouse 11, each bale of cotton was scanned with a hand-held computer-scanner to retrieve all the noted information on the ticket. Personnel at the warehouse 11 can then transmit such information for storage in the centralized data base 25. When received by the mainframe computer 10, a "receiving record" was temporarily formed for each bale, and then transferred internal within the computer to a master file. To evidence title to each bale, a warehouse receipt was automatically punched by the card punch 21. The punched warehouse receipt cards were then delivered to the various gin offices where the respective cotton bales originated. It was a practice of each gin office to then hold or maintain the warehouse receipt cards for the owners, or such cards were then delivered directly to the cotton producers or owners.

In response to various trading transactions, such as with a sale or loan, the warehouse receipt for each bale placed in a loan, or sold, was returned to the offices of the centralized computer location 8 for processing. The centralized trading offices then dispatched the warehouse receipt cards to the bank for collateral, in the event the bale was placed in a loan, or to the purchaser of the cotton bale. In like manner, when the purchaser of a cotton bale resold the bale to a textile mill, or the like, the warehouse receipt card was further transferred to the warehouse for shipment. The disadvantages of employing documentary title for each cotton bale is noted above.

Further details of the centralized cotton trading system are disclosed in the technical article "TELCOT TM : An Example of the Use of Information Technology for Competitive Advantage in the Cotton Industry", attached hereto as an Appendix.

Data Base Files

The detailed operation of a cotton trading transaction utilizing the electronic title system of the invention is described in more detail below in connection with FIG. 2 which details the data base structure utilized by the centralized mainframe computer 10. The data base 25 includes a gin master file 48 having a record for each cotton bale. The gin master file records include fields indicating the gin name and address, gin code, and the account information for those producers who are customers at the gin and have authorized the electronic trading of their cotton. The gin master file 48 also includes an indicator showing whether the individual producer wants his cotton represented either by a receipt in card form or electronic form. A bale master file 49 is also created to particularly identify each bale which is or can be traded in the system 8. The bale master file 49 includes data such as the warehouse code, warehouse tag, quality information, owner account number, bale status, storage date, etc.

Programmed and maintained within the centralized data base 25 for each bale is a receiving file 50. The receiving file 50 includes information unique to each cotton bale, as well as other information transmitted from the warehouse terminals 16 via the network 12 to the mainframe computer 10. As noted above, the information is obtained by scanning each bale with the hand-held scanner, and reading the information from the scanner device into the warehouse terminal 16 for further transmission to the mainframe computer 10. When received by the mainframe computer 10, the data of the receiving file 50 is transferred to a warehouse master file.

File 52 comprises a shipping order file which is employed when a buyer or the producer initiates a transaction in which a cotton bale is shipped. This file includes a record for each shipping order. The shipping order file 52 includes fields identifying the unique bale numbers, the destination of the bales, the mode of transportation and the date of shipment. Much of this information is entered into the shipping order file by a buyer via a buyer terminal 18.

A buyer master file 54 is also maintained in the centralized data base 25. A buyer master file record is unique to each buyer associated with the system, including fields having a buyer number and a title flag field. Each buyer record in the file 54 includes a flag field having at least two possible indications, one being that the transaction is to be carried out with an electronic warehouse receipt evidencing title to the particular bale, and the other indication that the transaction is to be carried out with a punched warehouse receipt card, i.e., a documentary type of title.

A significant file maintained in the data base 25 comprises a warehouse master file 56. This file includes a unique record for each cotton bale. Each such record has various fields, including a warehouse code, warehouse tag, bale weight, storage date, title flag, loan status, the date redeemed from the loan, and other fields shown in the Table below. When the cotton commodity is to be traded in blocks, the warehouse master file includes a record unique to each block of bales. The block record includes data identifying each bale belonging to the block. As will be described in more detail below, the warehouse master file 56 is accessed frequently by the computer 10 during the various trading transactions of a bale of cotton.

A comprehensive warehouse receipt audit file 58 is maintained in the data base 25. The audit file 58 is a long-term file which includes transaction data, such as each transaction date, the type of transaction and the bale number. The audit file 58 also includes records pertaining to each block of bales. In the event it is ever required to reconstruct the trading activity of a bale, or a lot of bales, the warehouse receipt audit file 58 can be accessed to determine or reconstruct the nature and extent of such activity.

An account authorization file 60 is maintained in the centralized computer data base 25. The account authorization file 60 includes information such as loan eligibility of a producer, and default producer payment information. As may be readily apparent to those skilled in the art, other data bases, files, fields, and information can be stored in the data base 25 to further enhance trading within the system. For example, in the event electronic funds transfer is implemented into the system 8, other files and data bases can be added for carrying out such enhanced activity.

Lastly, a producer payment file 62 is maintained in the data base 25. The producer payment file 62 includes data relative to those producers who authorize their cotton to be traded by or within the system 8. The file 62 includes data for each producer relating to the payment received, payment instructions, payment information, etc.

As noted above, in carrying out a transaction with respect to each bale of cotton, a record is generated or updated, which record has numerous fields identifying various aspects with respect to either the bale, the owner, the transaction, etc. The Table shown below identifies the various fields of a warehouse master file record as they relate to a particular cotton bale. As might be appreciated, not all information in the record is absolutely necessary to a trading transaction, and those skilled in the art may prefer to include yet other information depending on the commodity or the type of goods or the nature of the transaction. It is to be particularly noted that the field identified as "11 ETS-FLAG." indicates the type of title to be assigned to the bale of cotton. The title flag field can be programmed with multiple values, including a "+0" to indicate a punched card warehouse receipt, a "+1" to indicate that the centralized computer trading office retains the punched warehouse receipt, or a "+2" to indicate an electronic software type of warehouse receipt. In order to better understand the file shown in the Table, it should be noted that the "PIC" statements are fields, the "VALUE" statements are the values which the fields can assume, and the remaining statements are for comment purposes.

A record in the Table can also represent a block of commodities. If the block record field contains a "+8", then it is a block record. This flag is set in the event the particular bale of cotton is identified by the producer as belonging to a block of bales. Such a record would contain one or more fields which point to detail records for each bale in the block. The block record itself is stored in the data base 25, which block record identifies all the bales belonging to the block. In this manner, the individual bale records of a block are associated with the block record, and vice versa.

In the preferred form of the invention, the title flag field of the bale record includes plural bit positions to store the signed numerical title designations. Those skilled in the art may find that other designations can be utilized, and other numbers of bit positions. In its simplest form, a binary title designation can be efficiently utilized to store a "0" in a single bit position of memory to indicate an electronic title, or a "1" in the bit position to represent another type of title, or vice versa.

TABLE

COBOL File Descriptor - Warehouse Master File

```
                ==> F4100REC <==

F4100REC     FL4100 --- WHSE MASTER FILE
             KEYSIZE = 12
             RECSIZE = 255
```

```
02 WHSE-MASTER-RECORD.
   04 RECORD-KEY.
      05 WHSE-CODE-X.
         06 WHSE-CODE                            PIC S9(7) COMP-3.
      05 WHSE-TAG-X.
         06 WHSE-TAG                             PIC S9(7) COMP-3.
      05 CROP-YEAR-X.
         06 CROP-YEAR                            PIC S9(5) COMP-3.
      05 RECORD-TYPE-X.
         06 RECORD-TYPE                          PIC S9(1) COMP-3.
            88 ETS-RECORD                        VALUE +1.
            88 WAREHOUSE-MASTER-RECORD           VALUE +4.
            88 LOAN-RECORD                       VALUE +7.
            88 BLOCK-RECORD                      VALUE +8.
   04 RECORD-DATA.
      05 ETS-INFO.
   10 BALE-STATUS                      PIC X.
      88 INACTIVE                                             VALUE 'I'.
      88 BALE-ACTIVE-INVENTORY                                VALUE 'A'.
      88 BALE-RECEIVED-NOT-LOCATED                            VALUE 'R'.
      88 BALE-RECEIVING-ERROR                                 VALUE 'E'.
      88 BALE-NO-PRODUCER-ACCOUNT                             VALUE 'P'.
      88 BALE-SHIPPED-NOT-LOADED                              VALUE 'S'.
      88 BALE-LOADED                                          VALUE 'L'.
      88 BALE-IS-GIN-RETURN                                   VALUE 'G'.
      88 BALE-IS-REWORK-RETURN                                VALUE 'W'.
   10 STORAGE-DATE-YMD-X.
      11 STORAGE-DATE-YMD                        PIC S9(7) COMP-3.
   10 GROSS-WGT-X.
      11 GROSS-WGT.                              PIC S9(3) COMP-3.
   10 TARE-WGT-X.
      11 TARE-WGT.                               PIC S9(3) COMP-3.
   10 COMPRESSION-CODE-X.
      11 COMPRESSION-CODE                        PIC X(1).
         88 FLAT-REGULAR                                      VALUE '1'.
         88 FLAT-MODIFIED                                     VALUE '2'.
         88 STANDARD-DENSITY                                  VALUE '3'.
         88 GIN-STANDARD-DENSITY                              VALUE '4'.
```

TABLE-continued
COBOL File Descriptor - Warehouse Master File

```
        ==> F4100REC <==
F4100REC    FL4100 --- WHSE MASTER FILE
            KEYSIZE = 12
            RECSIZE = 255
```

```
            88 GIN-UNIVERSAL-DENSITY                 VALUE '5'.
            88 UNIVERSAL-DENSITY                     VALUE '6'.
            88 GIN-HIGH-DENSITY                      VALUE '7'.
 10 BAGGING-CODE-X.
    11 BAGGING-CODE                     PIC X(1).
            88 COTTON-BAG                            VALUE '1'.
            88 JUTE-OR-SUGAR-BAG                     VALUE '2'.
            88 BURLAP-BAG                            VALUE '3'.
            88 POLYETHYLENE-BAG                      VALUE '4'.
            88 POLYPROPYLENE-BAG                     VALUE '5'.
            88 NON-SPECIFICATION                     VALUE '6'.
            88 EXPERIMENTAL-BAG                      VALUE '7'.
 10 GIN-CODE-X.
    11 GIN-CODE                         PIC S9(5) COMP-3.
 10 GIN-TAG-X.
    11 GIN-TAG                          PIC S9(7) COMP-3.
 10 PRODUCER-ACCOUNT-NO-X.
    11 PRODUCER-ACCOUNT-NO              PIC S9(5) COMP-3.
 10 PRODUCER-LOT-NO-X.
    11 PRODUCER-LOT-NO                  PIC S9(3) COMP-3.
 10 ETS-FLAG-X.
    11 ETS-FLAG                         PIC S9(1) COMP-3.
            88 RECEIPT-PUNCHED          VALUE +0.
            88 PCCA-RETAINS-WR          VALUE +1.
            88 ETS-RECEIPT              VALUE +2.
 10 RECEIPT-PUNCH-FLAGS.
    15 RECEIPT-REQUESTED-FLAG-X.
       16 RECEIPT-REQUESTED-FLAG        PIC X.
            88 WHSE-REQUESTED                        VALUE 'W'.
            88 PRODUCER-REQUESTED                    VALUE 'P'.
            88 BUYER-ETS-REQUESTED                   VALUE 'B'.
    15 RECEIPT-REQUESTED-DATE-YMD-X.
       16 RECEIPT-REQUESTED-DATE-YMD    PIC S9(7) COMP-3.  3.
    15 RECEIPT-RECEIVED-DATE-YMD-X.
       16 RECEIPT-RECEIVED-DATE-YMD     PIC S9(7) COMP-3.  3.
    15 RECEIPT-INVOICED-DATE-YMD-X.
       16 RECEIPT-INVOICED-DATE-YMD     PIC S9(7) COMP-3.  3.
    15 PUNCH-PENDING-FLAG-X.
       16 PUNCH-PENDING-FLAG.           PIC X.
            88 WHSE-REQUEST-PUNCH                    VALUE 'W'.
                                                          'S'.
            88 WHSE-REQUEST-PUNCH-SEND              VALUE 'S'.
            88 PRODUCER-REQUEST-PUNCH               VALUE 'P'.
            88 BUYER-INVOICING-PUNCH                VALUE 'I'.
            88 BUYER-ETS-PUNCH-REQUEST              VALUE 'B'.
            88 RECEIVING-PUNCH                      VALUE 'R'.
            88 DUPLICATE-RECEIPT-REQUEST            VALUE 'D'.
            88 GIN-BALE-RETURNED-REQUEST            VALUE 'Z'.
            88 NO-PUNCH-IS-PENDING                  VALUE ' '.
    15 PUNCH-PENDING-DATE-YMD-X.
       16 PUNCH-PENDING-DATE-YMD        PIC S9(7) COMP-3.  3.
    15 DUPE-PUNCH-DATE-YMD-X.
       16 DUPE-PUNCH-DATE-YMD           PIC S9(7) COMP-3.  3.
 10 BOND-ISSUE-INFO.
    15 BOND-ISSUE-DATE-YMD-X.
       16 BOND-ISSUE-DATE-YMD           PIC S9(7) COMP-3.  3.
 10 CONVERT-TO-ETS-INFO.
    15 CONVERT-TO-ETS-DATE-YMD-X.
       16 CONVERT-TO-ETS-DATE-YMD       PIC S9(7) COMP-3.
 10 GIN-RETURN-FILLED-YMD-X.
    11 GIN-RETURN-FILLED-YMD.           PIC S9(7) COMP-3.
 10 RESAMPLE-FILLED-YMD-X.
    11 RESAMPLE-FILLED-YMD              PIC S9(7) COMP-3.
 10 RECLASS-FILLED-YMD-X.
    11 RECLASS-FILLED-YMD               PIC S9(7) COMP-3.
 10 REWORK-FILLED-YMD-X.
    11 REWORK-FILLED-YMD                PIC S9(7) COMP-3.
 10 REWEIGH-FILLED-YMD-X.
    11 REQEIGH-FILLED-YMD               PIC S9(7) COMP-3.
 07 CURRENT-OWNER-INFO.
    10 ETS-BUYER-NO-X.
```

TABLE-continued

COBOL File Descriptor - Warehouse Master File

```
              ==> F4100REC <==
F4100REC   |  FL4100 --- WHSE MASTER FILE
           |  KEYSIZE = 12
           |  RECSIZE = 255
```

| | |
|---|---|
| 11 ETS-BUYER NO | PIC S9(5) COMP-3. |
| 10 ETS-BATCH-NO-X. | |
|   11 ETS-BATCH-NO | PIC S9(5) COMP-3. |
| 10 ETS-INVOICE-NO-X. | |
|   11 ETS-INVOICE-NO | |
| 10 ETS-INVOICE-DATE-YMD-X. | |
|   11 ETS-INVOICE-DATE-YMD | PIC S9(7) COMP-3. |
| 10 ETS-PAID-FLAG-X. | |
|   11 ETS-PAID-FLAG | PIC X. |
|     88 ETS-PAID | VALUE 'Y'. |
| 10 FILLER | PIC X(03). |
| 07 TRANSFER-OWNER-INFO. | |
|   10 TFR-BUYER-NO-X. | |
|     11 TFR-BUYER-NO | PIC S9(5) COMP-3. |
|   10 TFR-BATCH-NO-X. | |
|     11 TFR-BATCH-NO | PIC S9(5) COMP-3. |
|   10 TFR-INVOICE-NO-X. | |
|     11 TFR-INVOICE-NO | PIC S9(7) COMP-3. |
|   10 TFR-INVOICE-DATE-YMD-X. | |
|     11 TFR-INVOICE-DATE-YMD | PIC S9(7) COMP-3. |
|   10 TFR-PAID-FLAG-X. | |
|     11 TFR-PAID-FLAG | PIC X. |
|       88 TFR-PAID | VALUE 'Y'. |
|   10 FILLER | PIC X(10). |
| 07 COMPRESSION-INFO. | |
|   10 COMPRESSION-YMD-X. | |
|     11 COMPRESSION-YMD | PIC S9(7) COMP-3. |
|   10 PRESSED-STOCK-FLAG-X. | |
|     11 PRESSED-STOCK-FLAG | PIC X(1). |
|       88 COMPRESSION-PAID-TO-GIN | VALUE 'G'. |
|       88 COMPRESSION-PAID-TO-WHSE | VALUE 'W'. |
|   10 FILLER | PIC X(10). |
| 07 BALE-ACITIVITY-FLAGS. | |
|   10 BALE-RECEIVED-FLAG-X. | |
|     11 BALE-RECEIVED-FLAG | PIC X(1). |
|       88 BALE-RECEIVED-TODAY | VALUE 'Y'. |
|   10 BALE PURCHASED-FLAG-X. | |
|     11 BALE-PURCHASED-FLAG | PIC X(1). |
|       88 BALE-PURCHASED-TODAY | VALUE 'Y'. |
|   10 BALE-CONVERTED-FLAG-X. | |
|     11 BALE-CONVERTED-FLAG | PIC X(1). |
|       88 BALE-CONVERTED-TODAY | VALUE 'Y'. |
|   10 BALE-SHIPPED-FLAG-X. | |
|     11 BALE-SHIPPED-FLAG | PIC X(1) |
|       88 BALE-SHIPPED-TODAY | VALUE 'Y'. |
|       88 BALE-UNSHIPPED-TODAY | VALUE 'N'. |
|   10 BALE -PUNCHED-FLAG-X. | |
|     11 BALE-PUNCHED-FLAG | PIC X(1). |
|       88 BALE-PUNCHED-TODAY | VALUE 'Y'. |
|   10 BALE-RECV-NON-ETS-FLAG-X | |
|     11 BALE-RECV-NON-ETS-FLAG | PIC X(1). |
|       88 BALE-RECV-NON-EST-TODAY | VALUE 'Y'. |
|   10 FILLER | PIC X(09). |
| 07 PRIOR-INVOICING-INFO. | |
|   10 PRIOR-ETS-BATCH-NO-X. | |
|     11 PRIOR-ETS-BATCH-NO | PIC S9(5) COMP-3. |
|   10 PRIOR-ETS-INVOICE-NO-X. | |
|     11 PRIOR-ETS-INVOICE-NO | PIC S9(7) COMP-3. |
|   10 PRIOR-ETS-INVOICE-DATE-YMD-X. | |
|     11 PRIOR-ETS-INVOICE-DATE-YMD | PIC S9(7) COMP-3. |
|   10 PRIOR-ETS-PAID-FLAG-X. | |
|     11 PRIOR-ETS-PAID-FLAG | PIC X. |
|       88 PRIOR-ETS-PAID | VALUE 'Y'. |
| 07 MORE-RECEIPT-PUNCH-INFO. | |
|   10 RECEIPT-PUNCH-PCCA-FOB-YMD-X. | |
|     11 RECEIPT-PUNCH-PCCA-FOB-YMD | PIC S9(7) COMP-3. |
|   10 RECEIPT-PUNCH-FORFEIT-YMD-X. | |
|     11 RECEIPT-PUNCH-FORFEIT-YMD | PIC S9(7) COMP-3. |
|   10 RECEIPT-PUNCH-DSP-RED-YMD-X. | |
|     11 RECEIPT-PUNCH-DSP-RED-YMD | PIC S9(7) COMP-3. |
| 07 MORE-PRIOR-INVOICING-INFO. | |

TABLE-continued
COBOL File Descriptor - Warehouse Master File

```
            ==> F4100REC <==
F4100REC    FL4100 --- WHSE MASTER FILE
            KEYSIZE = 12
            RECSIZE = 255
```

| | |
|---|---|
| 10 PRIOR-ETS-BUYER-NO-X. | |
|   11 PRIOR-ETS-BUYER-NO | PIC S9(5) COMP-3. |
| 07 FILLER | PIC X(53). |
| 05 WHSE-INFO REDEFINES ETS-INFO. | |
|   10 CERTIFIED-GROSS-WGT-X. | |
|     11 CERTIFIED-GROSS-WGT | PIC S9(3) COMP-3. |
|   10 CERTIFIED-TARE-WGT-X. | |
|     11 CERTIFIED-TARE-WGT | PIC S9(3) COMP-3. |
|   10 CERTIFIED-NET-WGT-X. | |
|     11 CERTIFIED-NET-WGT | PIC S9(3) COMP-3. |
|   10 CERTIFIED-DATE-YMD-X. | |
|     11 CERTIFIED-DATE-YMD | PIC S9(7) COMP-3. |
|   10 CERTIFIED-TIME-HMS-X. | |
|     11 CERTIFIED-TIME-HMS | PIC S9(7) COMP-3. |
|   10 SGS-CERTIFIED-FLAG-X. | |
|     11 SGS-CERTIFIED-FLAG | PIC X(01). |
|       8b SGS-BALE | VALUE 'Y'. |
|   10 FILLER | PIC X(09). |
| 07 LOCATION-INFO. | |
|   10 CURRENT-LOCATION. | |
|     15 CURRENT-SHED-X. | |
|       16 CURRENT-SHED | PIC S9(7) COMP-3. |
|     15 CURRENT-ROW-X. | |
|       16 CURRENT-ROW | PIC S9(7) COMP-3. |
|     15 CURRENT-SECTION-X. | |
|       16 CURRENT-SECTION | PIC S9(7) COMP-3. |
|   10 CURRENT-LOCATION-DATE-YMD-X. | |
|     11 CURRENT-LOCATION-DATE-YMD | PIC S9(7) COMP-3. |
|   10 PREV-LOCATION. | |
|     15 PREV-SHED-X. | |
|       16 PREV-SHED | PIC S9(7) COMP-3. |
|     15 PREV-ROW-X. | |
|       16 PREV-ROW | PIC S9(7) COMP-3. |
|     15 PREV-SECTION-X. | |
|       16 PREV-SECTION | PIC S9(7) COMP-3. |
|   10 PREV-LOCATION-DATE-YMD-X. | |
|     11 PREV-LOCATION-DATE-YMD | PIC S9(7) COMP-3. |
|   10 PREV-PREV-LOCATION. | |
|     15 PREV-PREV-SHED-X. | |
|       16 PREV-PREV-SHED | PIC S9(7) COMP-3. |
|     15 PREV-PREV-ROW-X. | |
|       16 PREV-PREV-ROW | PIC S9(7) COMP-3. |
|     15 PREV-PREV-SECTION-X. | |
|       16 PREV-PREV-SECTION | PIC S9(7) COMP-3. |
|   10 PREV-PREV-DATE-YMD-X. | |
|     11 PREV-PREV-DATE-YMD | PIC S9(7) COMP-3. |
|   10 FILLER | PIC X(10). |
| 07 LOADING-INFO. | |
|   10 LOAD-DATE-YMD-X. | |
|     11 LOAD-DATE-YMD | PIC S9(7) COMP-3. |
|   10 LOAD-TIME-HMS-X. | |
|     11 LOAD-TIME-HMS | PIC S9(7) COMP-3. |
|   10 FILLER | PIC X(18). |
| 07 SHIPMENT-INFO. | |
|   10 SHIPPING-ORDER-NO. | |
|     11 SHIPPING-VENDOR-NO-X. | |
|       12 SHIPPING-VENDOR-NO | PIC S9(5) COMP-3. |
|     11 BUYER-SHIPPING-ORDER-NO-X. | |
|       12 BUYER-SHIPPING-ORDER-NO | PIC X(9) |
|   10 SHIPMENT-ISSUE-YMD-X. | |
|     11 SHIPMENT-ISSUE-YMD | PIC S9(7) COMP-3. |
|   10 SHIPMENT-REQUEST-YMD-X. | |
|     11 SHIPMENT-REQUEST-YMD | PIC S9(7) COMP-3. |
|   10 SHIPMENT-TYPE-X. | |
|     11 SHIPMENT-TYPE | PIC X(1). |
|       88 TRUNK-SHIPMENT | VALUE '1'. |
|       88 RAIL-SHIPMENT | VALUE '2'. |
|       88 OTHER | VALUE '3'. |
|   10 EXPORT-DOMESTIC-FLAG-X. | |
|     11 EXPORT-DOMESTIC-FLAG | PIC X(1). |
|       88 EXPORT-SHIPMENT | VALUE 'E'. |

TABLE-continued

COBOL File Descriptor - Warehouse Master File

```
==> F4100REC <==
F4100REC    FL4100 --- WHSE MASTER FILE
            KEYSIZE = 12
            RECSIZE = 255
```

| | |
|---|---|
| 88 DOMESTIC-SHIPMENT | VALUE 'D'. |
| 10 FILLER | PIC X(12). |
| 07 INVOICE-INFO. | |
|   10 INVOICE-NO-X. | |
|     11 INVOICE-NO | PIC S9(7) COMP-3. |
|   10 VENDOR-NO-X. | |
|     11 VENDOR-NO | PIC S9(7) COMP-3. |
|   10 INVOICE-DATE-YMD-X. | |
|     11 INVOICE-DATE-YMD | PIC S9(7) COMP-3. |
|   10 FILLER | PIC X(10). |
| 07 SAMPLE-LOCATION-INFO. | |
|   10 CURRENT-SAMPLE-LOCATION. | |
|     15 CURR-SAMPLE-BUILDING-X. | |
|       16 CURR-SAMPLE-BUILDING | PIC S9(7) COMP-3. |
|     15 CURR-SAMPLE-ROW-X. | |
|       16 CURR-SAMPLE-ROW | PIC S9(7) COMP-3. |
|     15 CURR-SAMPLE-TRAY-X. | |
|       16 CURR-SAMPLE-TRAY | PIC S9(7) COMP-3. |
|   10 CURR-SAMPLE-LOC-DATE-YMD-X. | |
|     11 CURR-SAMPLE-LOC-DATE-YMD | PIC S9(7) COMP-3. |
|   10 PREV-SAMPLE-LOCATION. | |
|     15 PREV-SAMPLE-BUILDING-X. | |
|       16 PREV-SAMPLE-BUILDING | PIC S9(7) COMP-3. |
|     15 PREV-SAMPLE-ROW-X. | |
|       16 PREV-SAMPLE-ROW | PIC S9(7) COMP-3. |
|     15 PREV-SAMPLE-TRAY-X. | |
|       16 PREV-SAMPLE-TRAY | PIC S9(7) COMP-3. |
|   10 PREV-SAMPLE-LOC-DATE-YMD-X. | |
|     11 PREV-SAMPLE-LOC-DATE-YMD | PIC S9(7) COMP-3. |
| 07 SAMPLE-ORDER-INFO. | |
|   10 SAMPLE-ORDER-NO-X. | |
|     11 SAMPLE-ORDER-NO | PIC S9(7) COMP-3. |
|   10 SAMPLE-ORDER-DATE-X. | |
|     11 SAMPLE-ORDER-DATE-YMD | PIC S9(7) COMP-3. |
|   10 SAMPLE-ORDER-VENDOR-NO-X. | |
|     11 SAMPLE-ORDER-VENDOR-NO | PIC S9(7) COMP-3. |
| 07 FILLER | PIC X(019). |
| 05 LOAN-INFO-X REDEFINES ETS-INFO. | |
|   07 LOAN-INFO. | |
|     10 LOAN-TYPE-X. | |
|       11 LOAN-TYPE | PIC X(1). |
|         88 NO-LOAN-TYPE | VALUE ' '. |
|         88 FORM-A-LOAN | VALUE 'A'. |
|         88 FORM-G-LOAN | VALUE 'G'. |
|         88 LSA-LOAN | VALUE 'L'. |
|         88 FORFEITED-LOAN | VALUE 'F'. |
|     10 LOAN-ENTRY-DATE-YMD-X. | |
|       11 LOAN-ENTRY-DATE-YMD | PIC S9(7) COMP-3. |
|     10 LOAN-ENTRY-RECEIVE-AMT-X. | |
|       11 LOAN-ENTRY-RECEIVE-AMT | PIC S9(2)V9(2) COMP-3. |
|     10 LOAN-ENT-BATCH-SEQ-NO-X. | |
|       11 LOAN-ENT-BATCH-SEQ-NO | PIC S9(7) COMP-3. |
|     10 LOAN-REDEMPTION-DATE-YMD-X. | |
|       11 LOAN-REDEMPTION-DATE-YMD | PIC S9(7) COMP-3. |
|     10 RED-BATCH-SEQ-NO-X. | |
|       11 RED-BATCH-SEQ-NO | PIC S9(7) COMP-3. |
|     10 FORFEIT-DATE-YMD-X. | |
|       11 FORFEIT-DATE-YMD | PIC S9(7) COMP-3. |
|     10 LOAN-NUMBER-X. | |
|       11 LOAN-NUMBER | PIC S9(7) COMP-3. |
|     10 REDEMPTION-TYPE-X. | |
|       11 REDEMPTION-TYPE | PIC X(4). |
|         88 CASH | VALUE 'CASH'. |
|         88 CERTIFICATE | VALUE 'CERT'. |
|         88 NOT-RED-OR-FORFEIT | VALUE '    '. |
|     10 FILLER | PIC X(06). |
| 07 PREPAIDS OCCURS 10 TIMES. | |
|   10 NEW-STORAGE-DATE-YMD-X. | |
|     11 NEW STORAGE-DATE-YMD | PIC S9(7) COMP-3. |
|   10 ADVANCE-DATE-YMD-X. | |
|     11 ADVANCE-DATE-YMD | PIC S9(7) COMP-3. |

TABLE-continued
COBOL File Descriptor - Warehouse Master File

```
                  ==> F4100REC <==

F4100REC      FL4100 --- WHSE MASTER FILE
              KEYSIZE = 12
              RECSIZE = 255
```

| | |
|---|---|
| 10 EXT-BATCH-SEQ-NO-X. | |
|   11 EXT-BATCH-SEQ-NO | PIC S9(7) COMP-3. |
| 10 ADVANCE-AMT-X. | |
|   11 ADVANCE-AMT | PIC S9(5)V99 COMP-3. |
| 07 FILLER | PIC X(029). |
| 05 LAST-UPDATED-INFO. | |
|   07 UPDATE-INFO. | |
|     10 LAST-UPDATED-YMD-X. | |
|       15 LAST-UPDATED-YMD-X. | |
|         16 LAST-UPDATED-YMD | PIC S9(7) COMP-3. |
|     10 LAST-UPDATED-HMS-X. | |
|       15 LAST-UPDATED-HMS-X. | |
|         16 LAST-UPDATED-HMS | PIC S9(7) COMP-3. |
|     10 LAST-UPDATED-TERMINAL-X. | |
|       15 LAST-UPDATED-TERMINAL-X. | |
|         16 LAST-UPDATED-TERMINAL | PIC X(4). |
|     10 LAST-UPDATED-OPER-ID-X. | |
|       15 LAST-UPDATED-OPER-ID-X. | |
|         16 LAST-UPDATED-OPER-ID | PIC X(4). |

Each block record will be uniquely identified with a block number. Further, the block record is envisioned to contain a pointer to the detail records of each bale in the block, as well as a field signifying whether the block is represented entirely with a documentary type of warehouse receipt or entirely with an electronic warehouse receipt. The latter is defined herein as an electronic block receipt (EBR). Of course, the title field in each bale record must be the same as in the block record, as the trading is carried out for each block only with a single type of title. In other words, and for purposes of convenience and to eliminate a source of confusion or error, a whole block of bales cannot be traded by mixing the electronic and documentary titles in the same transaction. However, a block, once it is defined, can thereafter be split up into different sub blocks, with each sub block having a different type of title. For this case, each sub block essentially becomes a unique block in itself with a single type of title, and characterized by a unique record in the data base. As a further example, if a block of bales were initially represented by a documentary title, and if it were desired to trade half the block as an electronic block title, then a documentary title would be issued to the producer for the appropriate sub block of bales, and the remaining bales would each be represented by an electronic title in their individual records as well as a new block record of the sub block that was the subject of the trading transaction. Other variations are possible.

Trading Transactions

FIGS. 3A-3G illustrate the various steps in a cotton processing and trading transaction, some of which utilize the electronic warehouse receipt technique of the invention. According to FIG. 3A, block 70 illustrates the cotton processing steps which are carried out at the gin 9 to bale a producer's cotton. Once baled, a ticket is affixed to each bale, such ticket including a gin code defining the particular gin, and a gin tag which identifies the bale itself The tickets are individualized as to number so that each cotton bale is unique. Also, the producer's account number or other identifying indicia is noted on the ticket which is affixed to the bale. In the preferred form, such information is entered into the terminal 14 in a format according to a programmed screen menu. For each bale produced by the particular gin 9, such information is transmitted from the gin terminal 14, via the network 12, to the mainframe computer 10. This is shown as step 72. The bale master file 49 is created with data with respect to each gin 9 and each bale processed at the gin (step 74). Hence, each cotton bale can be identified as to the particular gin and the owner. The gin tag which provides a unique identification to the bale is only temporary, as a permanent identification is associated therewith at the warehouse 11.

FIG. 3B illustrates various steps in which a receiving file 50 is formed when the cotton bale arrives at the cotton warehouse 11. As each cotton bale, or block of cotton bales, is received at the warehouse 11 (step 80), it is weighed to determine an official weight, as well as other official or certified data, as noted above in the Table. Also, attached to each bale at the warehouse site is another ticket indicating the warehouse code, identifying the particular warehouse where the bale is stored, and a warehouse tag which includes a number that makes the bale unique with respect to any other bale. All the information noted in the receiving file 50 of FIG. 2 is accumulated with respect to each bale. Particularly, bar code information on each warehouse ticket is read by a hand-held device which includes the laser scanning and keyboard equipment noted above. All the information noted in the receiving file 50 is read from each bale and temporarily stored internally in the device, or transmitted by radio to the mainframe computer 10. This is noted in step 82 of the FIGURE. In step 84, there are shown the steps in which the record for each cotton bale is transmitted via the warehouse terminal 16 to the mainframe computer 10.

The warehouse data transmitted to the mainframe computer 10 for each bale creates the temporary receiving file 50. Generally, it is the practice of the warehouse operators to transmit each night all of the receiving file data to the mainframe computer 10. Because all such data from all the warehouses 11 can be transmitted to the mainframe computer 10 concurrently, the computer 10 is programmed to receive such information and sort the receiving files 50 according to the different warehouse codes. The receiving files 50 are thus stored and indexed according to the particular warehouse 11 in which the bales are stored. As the records of the receiving files are received from each warehouse 11, certain fields in the gin master file 48 are analyzed to determine if the owner has requested a warehouse receipt card as an indication of title, or has requested an electronic warehouse receipt (EWR).

In processing commodity information input into the trading system 8, decision block 86 is encountered to determine if the producer desires the commodity to be titled individually or as a block. The producer inputs such information at the gin 9, which information is transmitted to the mainframe computer 10 with the detailed data identifying the individual bales of cotton. In the event each cotton bale is to be processed or traded individually, program flow branches to decision block 87 where it is decided whether each bale is to be titled with a documentary warehouse receipt or with an electronic warehouse receipt. If the owner wants a card-form of warehouse receipt, the computer 10 branches from decision block 87 to block 88. Here, the mainframe computer 10 transfers the receiving data to the warehouse master record and writes the record to the warehouse master file with the title field marked with a numerical designation +0, indicating that the cotton bale is represented by a card-form of warehouse receipt. The individual card form of warehouse receipt is then punched accordingly. All individual warehouse receipt cards generated in this manner are then sorted according to the gin code and delivered to the respective gins, as noted by block 90. If the gin master file 48 indicates that the owner wants the card to be punched, but retained at the computer office, the warehouse master record is written to the warehouse master file 56 with the title field marked with a numerical designation +1. Other notations can be entered into the various fields of the gin master file 48 to advise other entities to prepare the card form of titles. For example, an indication in certain fields of the gin master file 48 can prompt the mainframe computer 10 to advise the punching of the individual (or block paper, when applicable) at a remote location, such as a gin 9 or association not associated with the cotton trading system 8 shown in FIG. 1. In any event, and as shown by numeral 88, the data of the receiving file is transferred to the warehouse master file 56, and the file 56 is updated to reflect that each cotton bale is to be represented by a card-type of title.

Reference is made back to program flow decision block 87. If the gin master file 48 indicates that the owner wants an electronic form of receipt, or, importantly, if the gin master file 48 is not marked with a preference, then the computer 10 branches to block 92. Here, the mainframe computer 10 transfers the receiving data to the warehouse master record and writes the record to the warehouse master file 56 with the title field marked with a numerical designation +2, indicating that the cotton bale is represented individually by an electronic form of warehouse receipt. Further, and as noted by program block 94, the mainframe computer 10 accesses the warehouse receipt audit file 58 to note the various aspects of the transaction. For example, the audit file 58 is written with data to note that the particular cotton bale was received at the warehouse, and data indicating the date, time, the bale number, warehouse code and type of transaction. Such data completely characterizes the event should such information be required at a later time.

Referring back to program flow block 86, if the bale record file indicates that such bale is part of a block of bales, then processing branches to decision block 91. It should be noted that initially the owner/producer of the cotton bales has a unique four digit account number, followed by a two digit number 00–99 for possible designations of one hundred different blocks of bales. In FIG. 3b, a further inquiry is made with respect to program flow block 91 to the effect of whether or not a block of bales are to be collectively represented by a single documentary warehouse receipt or an electronic block receipt. If an electronic block receipt (EBR) is to be associated with the entire block of commodities, further software instructions are carried out in program flow block 93 for generating a block receipt record identifying and characterizing the group of bales designated by the producer as belonging to the block. The block receipt record is anticipated to include information identifying whether the block is represented by an electronic or card type of title, and identifying each bale that belongs to the record, and other information similar to that of a bale record, such as loan status, producer/owner, sale date, ship date, payment flag, etc. In addition, each bale record itself is marked in another field that the bale belongs to a specific and unique block of bales. Those skilled in the art may prefer to accomplish this block type of electronic warehouse receipt designation by generating a different code in the title field, such code indicating that not only is the bale represented by an electronic warehouse receipt, but a block type electronic warehouse receipt. Once each bale record of a block, and the block record are generated, processor flow proceeds to program block 94 described above.

The mainframe computer 10 makes a determination at decision block 91 whether a block of the commodity is to be represented by a single block warehouse receipt. If so, program flow transfers to block 96. Program block 96, when carried out by the mainframe computer 10, is effective to transfer data to the warehouse master file 56 as a paper block receipt. Program block 98 illustrates those computer instructions carried out by the mainframe computer 10 to print a single block receipt which represents title to the entire block of individual commodity. The paper form of block title comprises an official sheet of paper having listed thereon an identification of all the cotton bales belonging to the block.

The foregoing description with respect to FIG. 3B illustrates the events occurring at the warehouse 11, and the various data base records that are created as a result thereof to characterize the event. Again, the data base records are prepared or updated in real-time, as many warehouses 11 can transmit receiving file information concurrently to the mainframe computer 10.

FIG. 3C illustrates those programmed operations carried out by the mainframe computer 10 when the owner or producer of a cotton bale desires to place such bale, or a block of bales, in a loan program. As is well known, government or other agencies can provide money loans to cotton producers who have warehoused the cotton. In this situation, the collateral for the loan is the cotton bale which is represented by a warehouse receipt.

Prior to the present invention, the collateral was represented by the card-type individual or block warehouse receipt, which card(s) was held by the bank giving the loan on behalf of the agency. The procedure for obtaining the loan based on physical receipted cotton was carried out as follows. The owner of the warehoused cotton informed the gin clerk of the particular bales to be the subject matter of the loan. The gin clerk assembled either the individual card warehouse receipts or the block receipt representing the bales to be entered into the loan. The clerk added two cards to the top of the stack of warehouse receipts containing written information about the owner and the payment instructions for the loan proceeds. The clerk then sent the stack of cards to the computer office where the information was manually entered into the computer 10. Eligibility tests were performed on the owner and the bales, and if these tests passed, the loan-entry forms and the card-form warehouse receipts were sent to the bank as collateral for the loan. A draft was drawn on the government for the total amount of the loan proceeds, and a check was printed and sent to the owner.

Loan entry procedures are modified under the present invention as follows: The gin clerk enters "/INQ" on terminal 14 for a particular account number, which shows all available cotton for that producer on the system, as well as the designation of the blocks of bales. EWR, EBR and physical warehouse receipt cotton is segregated and cannot be mixed. Cotton already in the loan is marked as loan cotton and cannot be combined with non-loan cotton. The clerk can move EWR bales to other EWR sub-accounts, and select the account for loan entry by entering an "IL" function on terminal 14. This builds a record in the producer payment file 62 which uses the default payment instructions on account authorization file 60. The clerk then changes the default payment instructions, if necessary, with terminal 14 and performs an online transaction "/GIP". At this time producer eligibility for loan entry is checked at block 102, and the process will not be allowed to be completed if the account is not eligible for the loan. If any bales fail these tests at block 102, the mainframe computer 10 transmits a return message to the gin terminal 14 to indicate the bale cannot be involved in a loan, and thus such bale must be removed from the entry. The gin clerk can then remove such bale from the loan transaction, or another bale can be substituted and the transaction resumed. If all edit checks are passed, the clerk can then give positive confirmation on terminal 14 transaction "/GIP" that the electronic titled bales are ready to be invoiced by entering "INV" on terminal 14.

The mainframe computer 10 accesses the warehouse master file 56, as shown by block 110. At this point, all tests pass in obtaining a loan on the lot of bales, and thus the loan transaction itself is processed by the centralized trading system 8. Particularly, a loan field in the bale record, and the block record, if applicable, of the particular bale is updated to show that the bale or block of bales are the subject of a loan. Further, the mainframe computer 10 accesses the warehouse receipt audit file 58, as noted by program flow block 112. The audit file 58 is updated to show a "loan entry" status, as well as to reflect the warehouse code, tag, date, time and transaction type for each such bale. This data recorded in the audit file 58 fully characterizes the loan transaction event. Next, program flow block 118 illustrates that since the cotton bale or block of bales are represented by an electronic warehouse receipt, then data indicative thereof is written on a magnetic tape 24 for later use by the commercial bank involved in the loan transaction.

Program flow block 120 illustrates the step in which the loan entry forms required by the government are printed. Program flow block 122 illustrates the step in which the forms and the magnetic tape concerning the loan status of each of the cotton bales is transferred to the particular bank involved in the transaction. In like manner, program flow blocks 122 and 124 indicate that the government loan program authorities are notified that the bale or block of bales are involved in a loan, and that the bale or block is represented by an electronic warehouse receipt. Further action carried out by the mainframe computer 10 includes the activation of the printer 23 to produce a check payable to the producer for the loaned amount (block 126). The mainframe computer 10 also produces documents for the governmental authorities and a draft from the government account.

Figure 3D:
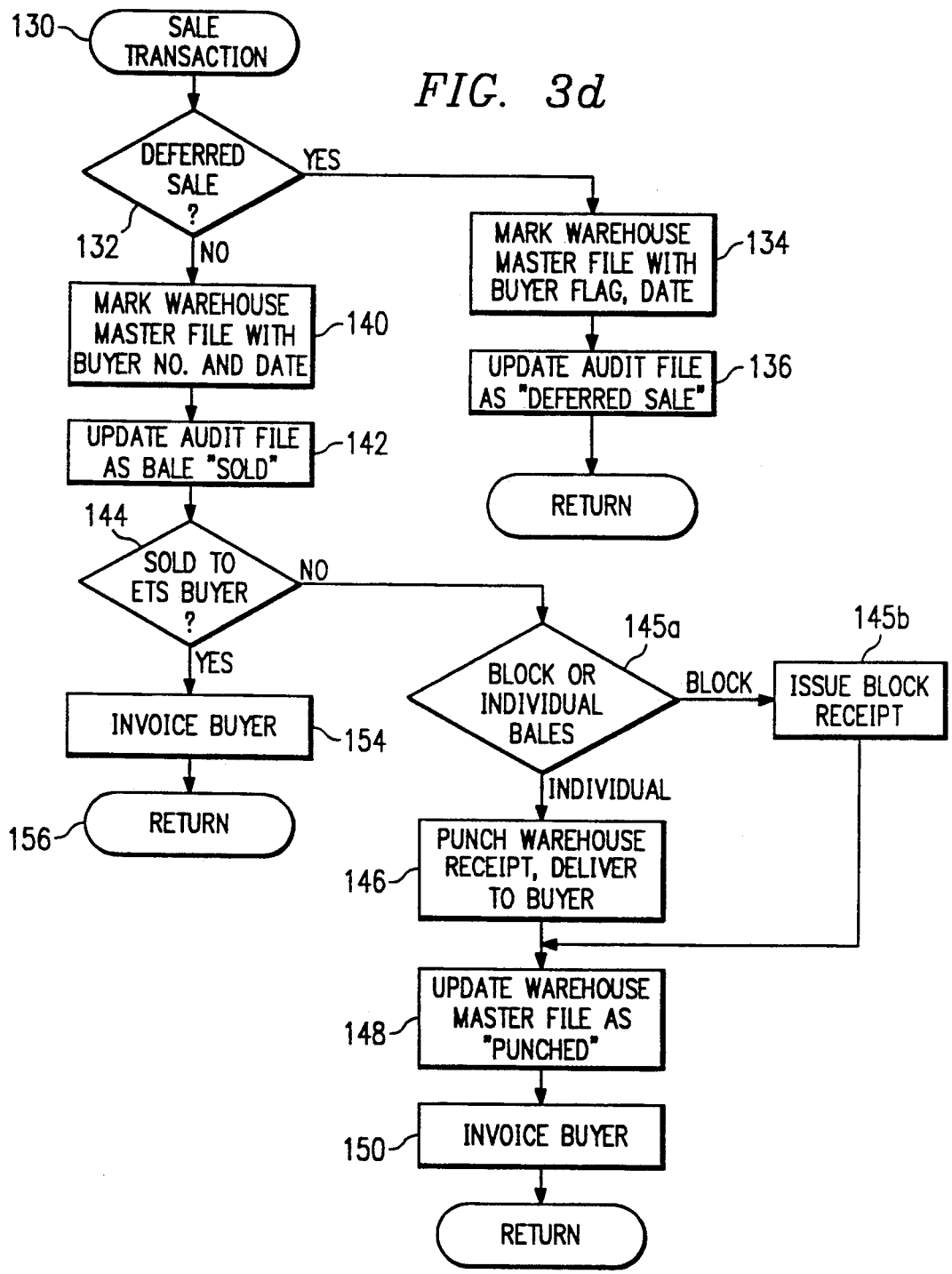

With reference now to FIG. 3D, there are shown the programmed operations of the mainframe computer 10 in carrying out the sale of a cotton bale. In order to invoke the program steps of FIG. 3D, information is input into a buyer's terminal 18, which information is indicative of a desire to look at bales available for sale. Also, in response to such a request, a menu appears on the buyer's terminal screen indicating information to input to complete a transaction for purchasing one or more bales of cotton, or a block of bales. One item in the "sale" menu to be filled in by the buyer is whether or not such sale is a deferred sale, as shown by decision block 132. A deferred type of sale occurs when the parties agree to sell a bale of cotton, agree on a particular price, but payment is to be deferred until a later time. Many such transactions occur with respect to cotton bales which are involved in a government loan program, as government interest rates are generally more favorable than those of commercial banks. In any event, if the sale of the particular bale is of the deferred type, the mainframe computer 10 branches to program block 134, whereupon the warehouse master file 56 is accessed to denote that such bale is associated with a deferred sale. In practice, a deferred sale flag is set in the particular record of the bale in the warehouse master file 56. Such record is also updated to reflect the buyer number, a transferral of ownership and the date and time. Further, the warehouse receipt audit file 58 is accessed, as noted by reference numeral 136. The audit file record for the particular bale is updated to reflect a deferred sale transaction. The mainframe computer 10 then returns for further processing of requests.

With reference back to the decision block 132, if the sale is not of the deferred type, program control is branched to block 140 where the warehouse master file 56 is updated to reflect the buyer's number and the date. Both the bale record and the block record, if applicable, are updated. Step 142 indicates that the audit file 58 is also accessed to log the transaction of the particular bale as "sold", as well as the date and time. From block 142, program flow branches to decision block 144 to determine if the buyer is involved or associated with the electronic title system of the invention, as incorporated in the system noted in FIG. 1. Such a determination is made by accessing the buyer master file 54 to determine whether or not the buyer is so involved. With respect to the buyer terminals 18 connected via networks 46 to the mainframe computer 10, some or all of the buyers may have previously agreed to carry out cotton trading transactions using the electronic title of the invention, i.e., an electronic warehouse receipt, rather than the card form of title. However, those buyers not agreeing to so conduct their cotton trading business may rely on the traditional card form of title. As noted above, the card form of title necessarily incurs longer transaction periods, as such cards require transferral by mail or other common carriers. Also, the cards can be lost, stolen, damaged or forged, all of which adds further loss or delay to the trader.

On a negative determination of block 144, the mainframe computer 10 carries out steps 145 and 146 to either activate the card punch 21 and punch individual warehouse receipts, or activate printer 23 and print a block warehouse receipt and deliver the same to the buyer. As noted in program flow block 148, the master warehouse file 56 is updated to reflect that the cotton bale is represented by a traditional card form of title. The buyer is invoiced (block 150) for the amount of the sale, plus any additional agreed upon costs. In practice, each cotton bale is not invoiced separately, but rather lots or blocks comprising a number of bales are involved in a common transaction such that the buyer is invoiced with a single document, indicating the various bales in the block. From program flow block 150, processing returns to process further transactions.

In response to an affirmative result of decision block 144, the buyer operating with the electronic title system (ETS) is invoiced, as shown by program flow block 154. An ETS buyer is invoiced by the mainframe computer 10 activating the printer 23 to produce a paper invoice for mailing to the buyer. Further, the printer 23 is caused to print a money draft payable to the seller the same day of the transaction. Also, the mainframe computer 10 produces a machine readable record of the purchase on magnetic tape or diskette which is sent to the buyer, or transmitted to him electronically over the network. Whether the buyer desires a magnetic tape or diskette form of transaction record is determined by data initially entered in a field of the buyer master file 54 to indicate whether the sale transaction is to be recorded and forwarded in the form magnetic tape or diskette, or other medium.

The commodity can also be traded multiple times inside or outside the centralized trading system 8. The electronic warehouse receipt system will keep track of the current owner electronically, and ensure that fraud does not occur. This process is shown in FIG. 3G. The owner and the purchaser each have terminals 18 connected to the mainframe computer 10. They agree on the terms of the sale, and the owner enters "/BBB" on terminal 18, as shown by block 200. A menu screen is presented showing bales which are owned by him (block 202). This information is obtained by the mainframe computer 10 from the warehouse master file 56. He marks with an "x" those bales which he wishes to sell, enters the buyer number of the purchaser, a sale number and the price that they have agreed upon. As illustrated in program block 204, the warehouse master file 56 is marked with a status code of "pending sale" for each of the selected bales The purchaser enters "/BBV" and the sale number on this terminal 18, and the warehouse code and tag of the selected bales are displayed on his screen. By looking at the bales listed on the screen (block 206), the purchaser can verify that the selected bales are in fact the ones that he has agreed to buy, and that the price is as agreed. The purchaser enters a code to indicate that he has verified the sale (block 208). The warehouse master file status for the subject bales is then changed to "pending payment", as noted in block 210. While in this status, the owner cannot then sell or otherwise dispose of the bales. The purchaser is then responsible for paying the owner for the bales (block 212). When the owner receives the funds, he again uses his terminal 18 to indicate that fact (block 214). The mainframe computer program then changes the owner's name in the warehouse master file 56 to that of the purchaser (block 216). Once the new owner's name is registered, the "pending payment" status is removed, as shown in program flow block 218. A record is added to audit file 58 to indicate that an owner transfer (owner XFER) has occurred, and the old owner name is changed to the new owner (block 220).

Returning to program flow block 208, if the terms of the sale are not agreed upon, the program control branches to block 222. In this event, the current owner is notified by way of a screen message, and either party can enter a command to cancel the transaction. The "pending sale" status is removed and the bales can then be the subject of another trading transaction. This is shown in block 224. If either owner or purchaser or both are financing their purchases of the commodity through a bank, then approval of this type of transaction may be required by the bank. In this event, a terminal similar to terminal 18 would be installed at the bank, and bank approval would be required by the mainframe computer 10 before the transaction could be completed.

The commodity trading system 8 can accommodate either the card or the electronic form of title, and that form can be changed back and forth any number of times. For example, an owner can request that the cotton bale be converted from a card form of warehouse receipt and be titled with an electronic warehouse receipt. With this request, the owner surrenders the card-type warehouse receipt which, when received at the offices of the central trading system 8, is voided. Only after the card is voided is the data base record changed to reflect that the bale can thereafter be traded using an electronic title. As can be appreciated, the warehouse master file 56 is changed to reflect the new status of the cotton bale. With such a procedure, it is assured that the cotton bale cannot be represented simultaneously by two different types of title.

Figure 3E:
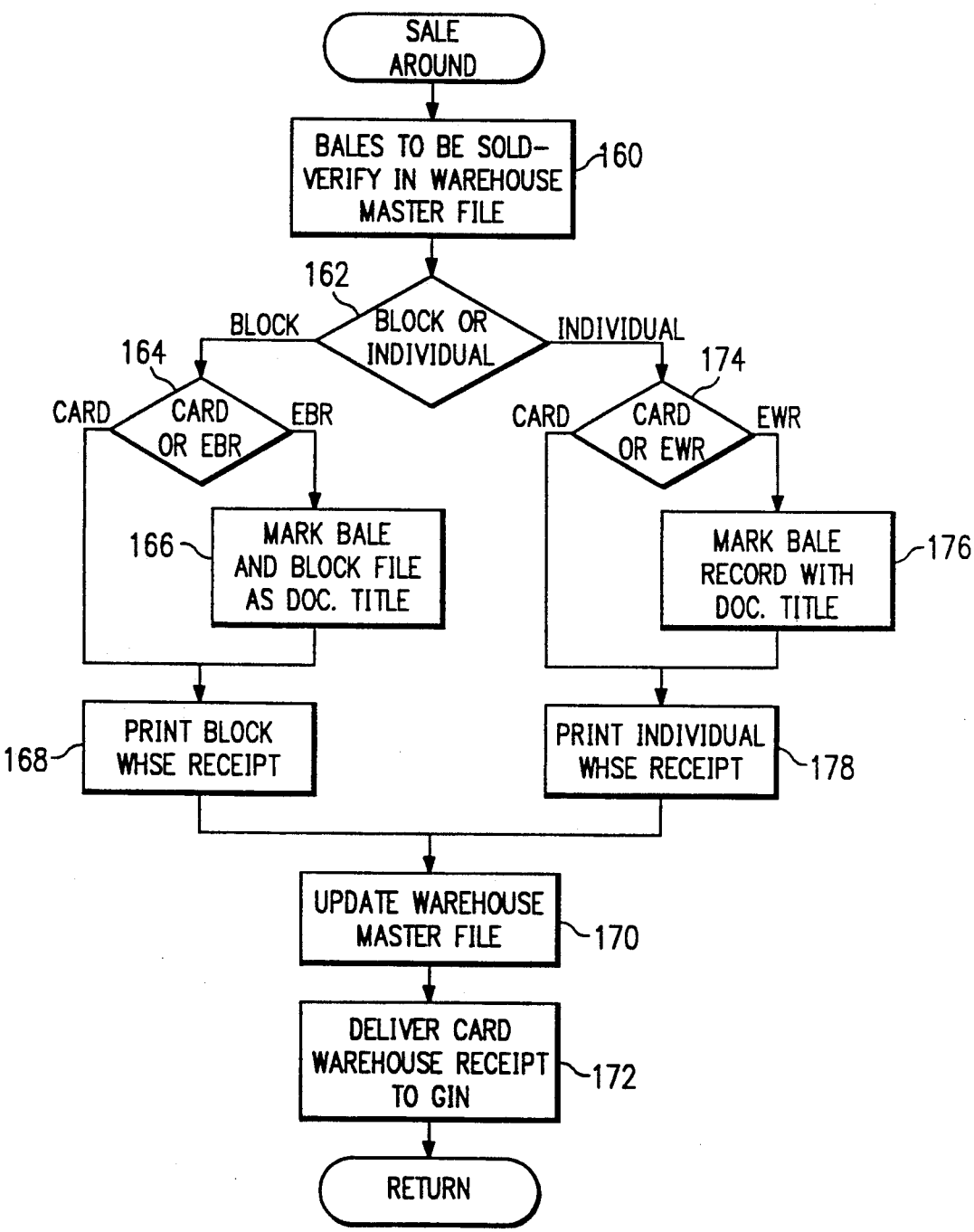
Figure 3G:
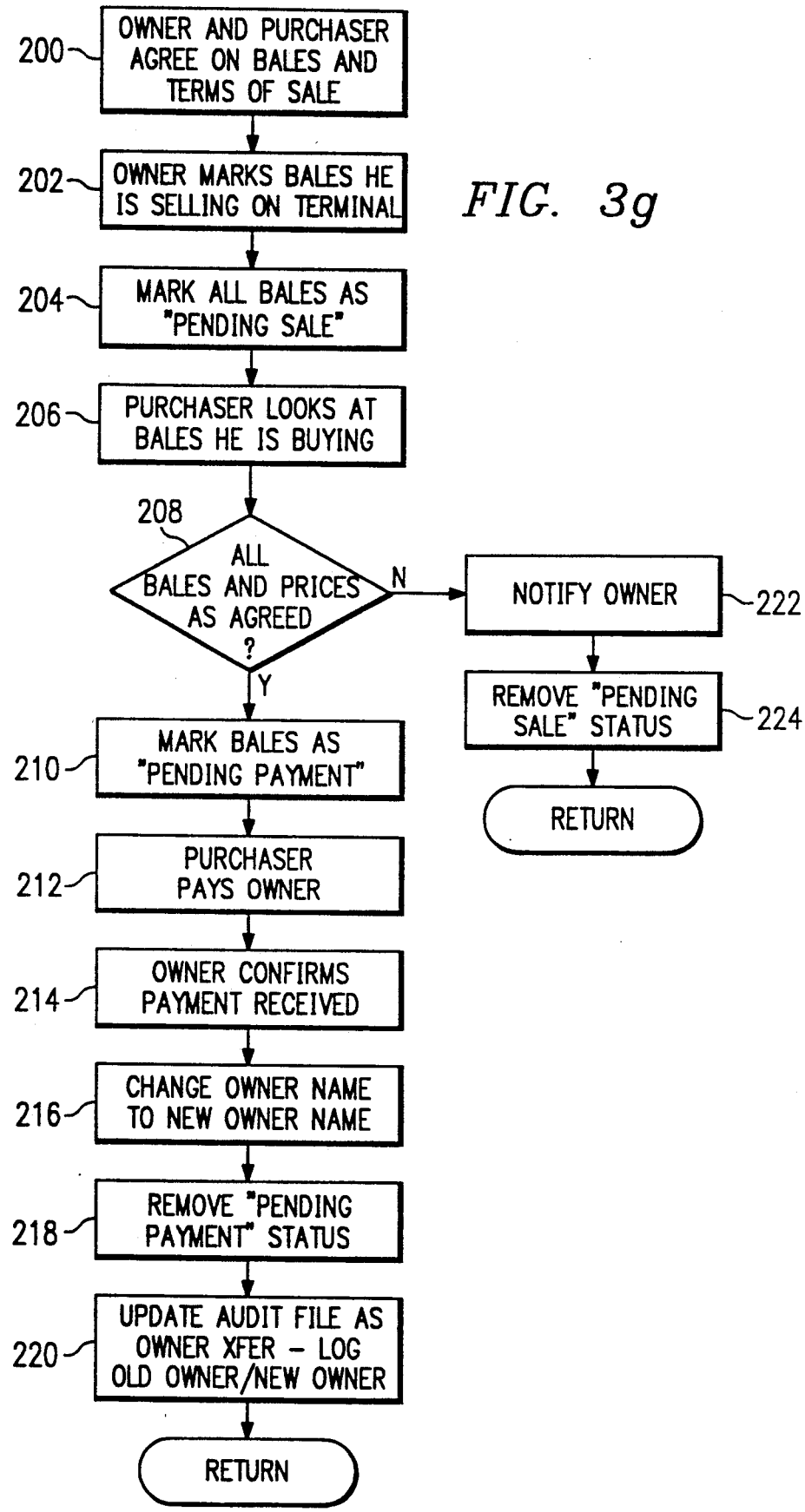

FIG. 3E illustrates a situation in which the sale of a cotton bale is carried out in a manner not utilizing the trading system 8 shown in FIG. 1, except only as to a minor extent. Such a sale is termed a "sale around". In other words, cotton bales stored in a warehouse 11 associated with the centralized trading system 8 can be sold outside of such system, in which event the traditional warehouse receipt cards are utilized as evidence of title. In this situation, a producer can inform a gin clerk of the identity of the bales sold, whereupon the clerk enters into the terminal 14 the relevant information which is then transferred via the network 12 to the mainframe computer 10. The warehouse master file 56 is consulted (block 160) to determine if such bales are indeed available for sale. If the bales comprise a block of bales, the system verifies that all bales of the block are to be the subject matter of the transaction. Proceeding to decision block 162, the trading system retrieves the bale record of each bale, and if a block of bales is involved, the block record is retrieved to determine if the type of transaction relates to individual bales or a block of bales. The purpose of this decision block is to determine if a warehouse receipt is to be produced for each bale, or if a single block warehouse receipt is to be punched for the entire block of bales. Since the transaction is a sale around, the end result is the creation of a documentary type of warehouse receipt. Inherent in the program flow are additional checks to determine if a documentary title has already been punched for the bale or block of bales and previously delivered to the producer/owner. If so, then the punching of another warehouse receipt is prevented, otherwise duplicate receipts would exist for a single bale or block of bales.

If a block transaction is the subject matter of the sale, then program flow branches from 162 to decision block 164. Here, if the title of the bale is presently of the documentary type, then a block warehouse receipt is printed at 168, if one has not already been printed. All the cards are then delivered to the gin 9 that initiated the "sale around" transaction. This is shown as block 172. As noted in program flow block 170, the mainframe computer 10 accesses the warehouse master file 56 to update the title flag field to indicate that the bales are presently titled with a block warehouse receipt. The gin 9 can then deliver the block receipt in due course to the buyer or to the seller of the cotton bales.

Returning to decision block 164, if the bales to be sold are presently represented by a block electronic warehouse receipt, then the bale records and the block record is updated to reflect a change to a documentary block title, as noted in program flow block 166. Processing proceeds to program flow block 168 as described above.

In the event the sale around transaction is not a block transaction, but rather concerns individual bales, processing proceeds from decision block 162 to decision block 174. If the individual bale is presently represented by a card type of receipt, processing branches to 178 where a warehouse receipt is printed or punched for that particular bale. If, on the other hand, the bale is presently represented by an electronic warehouse receipt (EWR), then processing branches to 176 where the bale record is changed to reflect a documentary title. The documentary title is punched at program flow block 178, and processing proceeds to 170 in the sam ⓡ manner described above.

With respect to FIG. 3F, there are shown the various program steps in a shipping transaction of a cotton bale. Again, this part of the program is invoked when a buyer or owner of the cotton commodity enters into a buyer terminal 18 an indication or a directive to ship a bale or a block of bales. A buyer may initiate such a transaction by inputting into a buyer terminal 18 the designation "/BSO" indicating a buyer shipping order. The mainframe computer 10 recognizes such a request and returns to the buyer terminal 18 a menu to be filled in with regard to the pertinent information necessary to carry out the shipping transaction. As noted in program block 180, the buyer inputs the pertinent shipping transaction data, including the bale numbers or block number, the destination, the mode of transportation, the date of shipment, and instructions to carry out each shipping order.

When such information is received by the mainframe computer 10, various validation checks are carried out to determine whether or not the shipping instructions can indeed be carried out. Such validation checks are shown in program flow block 182. The validation checks noted in block 182 are carried out by accessing the warehouse master file 56. Particularly, various fields in the file 56 of each bale are accessed to determine if the shipper is the registered owner, if the bale is in the government loan, if the bale is recorded as an electronic warehouse receipt or associated with a block receipt, and if the bale or block of bales have already been shipped. If either item a) or c) is negative, or if either item b) or d) is affirmative, then the validation check fails, whereupon program flow branches to block 184. In block 186, a fail message is returned to the shipper, indicating why the shipping transaction cannot be carried out. In response to a fail message, a buyer can substitute other bales or cancel the bale from the shipping order, as noted in program flow block 185. If the shipping transaction can indeed be carried out with respect to the tests of block 182, then program flow branches to block 186 where a further validation check is carried out by consulting the account authorization file 60.

The warehouse master file 56 is a data base maintained by the mainframe computer 10 that reflects the actual receipt of payment of any cotton bale involved in a sale transaction. Only after such bales have been paid for, can a shipping transaction be carried out. The "paid for" status of each bale can be entered into the warehouse master file 56 by personnel with the local terminals 20 or by reading such data from magnetic tapes 24 read by the mainframe computer 10. If a cotton bale subject to a shipping order has not yet been paid for, the validation check 186 fails and a message is returned to the shipper, as shown by block 184. From block 184, the mainframe computer 10 provides the shipper terminal clerk with the opportunity to change or correct the bales to other qualified bales. This is shown in block 185. On the other hand, if the bale has indeed been paid for according to the tests of block 186, all validation checks pass and program flow continues to block 187. Decision block 187 includes further tests that relate to transactions involving blocks of bales. For example, one test conducted in program flow block 187 determines if all bales in a block are being shipped. In a block transaction, all bales of the block must be subject in the same transaction, otherwise the test fails. If the test according to decision block 187 is negative, processing proceeds to program flow block 184 described above. On an affirmative response from decision block 187, processing continues to block 188.

Shipping orders for each cotton bale are available to the warehouse immediately provided said bales have passed the aforementioned audits. In practice, shipping orders for each cotton bale are not immediately dispatched to the various warehouses 11, but rather are accumulated 30 throughout a day's business, and are then transmitted or otherwise made available for access via the warehouse terminals 16. Each evening, the mainframe computer 10 sorts all the bale records subject to a shipping order with respect to warehouse codes. In this manner, an entire shipping order list can be made available to the various warehouses 11 so that the particular bales stored therein can be shipped. Preferably, the shipping order data is transmitted to each warehouse so that during the next business day when the warehouse terminals 16 are turned on, the shipping orders for that day are automatically printed. The warehouse personnel can then take the various shipping orders and retrieve the requisite bales for shipment that day. In practice, the shipping order information is also loaded from the warehouse terminals 16 to the handheld scanner devices described above. As each bale is retrieved from the warehouse 11, the warehouse ticket is scanned as to tag identity to verify that it is the correct bale. This serves as a check to determine that only the correct bales are shipped.

Should a particular warehouse require access to shipping orders for subsequent or other days, access can be had to the data base 25 of the mainframe computer 10 for such information. For example, commands can be input into the warehouse terminals 16 for accessing the shipping order file 52 to retrieve shipping orders for the next day, or any subsequent day, if any such shipping orders exist.

As noted in program flow block 190, the warehouse master file 56, as well as the warehouse receipt audit file 58 are updated to reflect the "shipped" status of each bale identified on a shipping order. The foregoing completes the steps carried out by the mainframe computer 10 in coordinating the trading requests efficiently to achieve shipment of particular cotton bales.

It should be noted that certain management procedures of the warehouse master file 56 and the warehouse receipt audit file 58 are maintained. For example, the warehouse master file 56 is maintained on-line with respect to each cotton bale for a period of one year after shipment period. Thereafter, the records of cotton bales which have been shipped more than a year previously are transferred to magnetic tape and maintained indefinitely in a vault. The same safeguards are carried out with respect to the warehouse receipt audit file 58 so that at any subsequent period of time, the records can be retrieved to determine the nature and extent of the transactions involved with any particular bale of cotton.

From the foregoing, disclosed is a technique for trading a commodity, or other goods, and assigning to such commodity or goods an electronic title. With respect to the cotton commodity, evidence of title of each bale of cotton can be carried throughout the life of the bale in an electronic data base, thereby eliminating the cumbersome transaction with computer cards and the attendant disadvantages thereof. A technical advantage of the invention is that either individual bales or blocks of bales can be traded using either electronic or documentary types of titles. Importantly, the electronic title system of the invention can be conveniently integrated with other software application programs or operating systems to allow commodities or goods to carry with them title by way of electronic storage and flag techniques. Those skilled in the art may prefer to employ the principles and concepts of the invention with respect to the exclusive use of an electronic or software title, without the option of the use of a documentary type of title.

Therefore, while the preferred embodiment of the invention has been disclosed with respect to a specific system and software, it is to be understood that many changes in detail may be made as a matter of programming choices, without departing from the spirit and scope of the invention, as defined by the appended claims.

APPENDIX

Telcot TM : An Example of the Use of Information Technology for Competitive Advantage in the Cotton Industry

Abstract

This article describes the strategic use of information technology by Plains Cotton Cooperative Association (PCCA). TELCOT, a computer-based electronic marketing system developed by PCCA, provides cotton traders with functions much like those available to NYSE or AMEX traders. TELCOT transformed PCCA from a small cotton merchant to a major cotton broker. Handling 115,000 to 240,000 computer transactions per day, TELCOT provides over 20,000 cotton producers, 40 buyers, and 200 gin operators with an electronic marketing service that has helped PCCA grow from a $50 million to $500 million dollar enterprise in just 15 years.

INTRODUCTION

Cotton is still king in the Southwest. Roughly 50 percent of the U.S. Cotton Crop is grown in Texas and Oklahoma. This cotton amounts to roughly 10 percent of the world crop in any given year. Cotton and cotton seed oil are multi-billion dollar industries and, along with oil and oil services, are the driving forces of the West Texas economy.

Plains Cotton Cooperative Association (PCCA), founded in 1953 by 5,000 cotton farmers, was established as a vehicle to help market the cotton produced by its members. In the beginning, PCCA served primarily as a merchant, buying cotton from its members and reselling to textile mills. By the late 1960s, PCCA bought more than 90 percent of the cotton produced by its members.

Attempting to acquire the best price for its members' cotton, PCCA became increasingly aware that the antiquated system of securing bids by telephoning a few buyers was both inefficient and costly for the producer. In 1975, Dan Davis, then President of PCCA, seeing the opportunity to create a more efficient market, invested approximately $2 million dollars to create an electronic marketing system for Plains' cotton. A production version of TELCOT was installed and available for use later that year.

Today, the trading features of TELCOT resemble those of the major stock exchanges. Members of the cooperative, numbering approximately 22,000 by 1990, chose from several marketing alternatives to offer a given number of bales of cotton (known as a lot) to cotton buyers. The quality of a producer's cotton is determined by the U.S. Department of Agriculture-Agricultural Marketing Service (USDA-AMS) and is entered into the TELCOT system. Buyers scan the system for lots offered by producers, make competitive blind bids, buy at a firm asking price or enter a counter offer bid.

Every TELCOT transaction generates a commission for PCCA. On a typical day, TELCOT processes approximately 115,000 on-line transactions. The system has handled a peak day of nearly 240,000 transactions. Over the fifteen years that TELCOT has been available, PCCA has grown from a $50 million to a $500 million dollar per year business, and has traded 14 million bales valued at $3.3 billion.

TELCOT has transformed the Texas and Oklahoma cotton business. Where PCCA once bought almost all of its members' cotton, today it buys less than 30 percent. Rather than functioning only as a merchant, actively purchasing and selling cotton itself, TELCOT has put PCCA in the brokerage business. They now provide an efficient and effective means of executing transactions between all the major cotton buyers and sellers. Using IBM PS/2 model 70s and 50s provided by PCCA, over 200 cotton gins and 40 buyers have direct access to TELCOT. Running on an IBM 3090 supported by a team of 20 programmer/analysts, the system transfers data using 11,000 miles of leased telephone lines and, in some locations, satellite communications. The current analog circuits are being replaced by FM radio data transmission. Both buyers and sellers have full information concerning the market at any point in time.

This paper describes how a relatively small, remotely located business has successfully used information technology to produce a sustainable competitive advantage. By tracing the strategic impact of TELCOT, this paper also provides evidence of the dynamic nature of this impact. Most importantly, this paper demonstrates that it is the strategic application of technology and not the technology itself that is critical to success.

BACKGROUND

Cooperatives directly contribute over one-hundred-billion dollars a year to the U.S. Gross National Product. They include such household names as Agway, Ocean Spray and Land O'Lakes. Founded in 1953, Plains Cotton Cooperative Association was formed to help market cotton for Texas and Oklahoma producers. This was not the first time that this independent group of farmers had decided to band together in a cooperative arrangement. In 1953 they had formed a coop oil mill to process cotton seed and in 1940 they organized a coop warehouse to assist them in the storage of cotton. PCCA was founded with $12,000 dollars worth of uncashed dividend checks from the coop oil mill. Beginning in 1970, in combination with other U.S. cooperatives from different regions of the country, PCCA formed AMCOT to more efficiently market cotton on a worldwide basis. Today PCCA employs approximately 750 people, participates in the trading of 40 percent of the U.S. cotton crop, and owns a denim mill which produces enough denim to make 25 million pairs of Levis per year.

In the early years, PCCA had functioned as a secondary outlet for its members' cotton. They purchased cotton when the price was depressed or when no market existed and sold it directly to the textile mills when prices recovered. PCCA took title to the cotton and paid the producer an agreed upon price, thus assuming the market risk. If prices improved quickly, PCCA made money for its members' if prices remained depressed, the added cost of storage meant a loss for the cooperative.

By the 1960s, PCCA was handling over 90 percent of its members' cotton. In other parts of the country, pools were used to collectively market cotton. In a pool, the grower signs a contract and the title to his cotton passes to the pool. When the cotton is later sold, the grower receives the average price for that type of cotton, thus the grower assumes the market risk. This system allows everyone to compete equally, preventing brokers and gin operators from extorting low prices from desperate farmers who needed the cash to plant the following year's crop. PCCA operates a pool, but it has never been as successful with Texas and Oklahoma producers as it has been with farmers in other parts of the country. An alternative to pooling is to deal with independent brokers who either buy the cotton while it is still in the field or purchase it after it is ginned and classified (grade, staple, micronaire, etc.) by the USDA-AMS. Grade is a twofold measure of color and trash content in the cotton, staple is the length of the fiber, and micronaire represents the maturity of the fiber. By law, a 6 ounce sample of each 500 pound bale of cotton is taken and tested by the USDA[1].

[1] Because of the unpredictable weather and the history of dryland farming, the consistency of West Texas cotton varies to the extent that each bale is somewhat unique.

By the early 1970s, PCCA was handling less than 20 percent of its member's cotton because the cooperative didn't have the financial strength to absorb the market risk. Many PCCA members felt they could get better prices by selling directly to the independent brokers rather than to PCCA. PCCA was in trouble! If PCCA was to survive and be valuable to the 80 percent of its membership that were now transacting their own sales through other buyers, it had to provide growers with a service that helped them sell their cotton. To accomplish this, Dan Davis envisioned an electronic marketing system for cotton much like that available for trading stocks on the NYSE or AMEX.

TELCOT was a high risk venture for PCCA. In the mid-1970s, telecommunications technology was the exception rather than the rule in even the most computer sophisticated businesses. PCCA planned, however, to go from virtually no computing to a state-of-the-art, on-line real-time system practically overnight. Moreover, the overwhelming majority of its end users were novices. Originally, the initial TELCOT system was developed by contract programmers and was up and running in 1975, eight months after initiation of the project. Darryl Lindsey, an account executive with IBM, was active in the early development of TELCOT. Subsequently, he was hired by PCCA and began to assemble a staff of systems professionals.

The system provides several refinements for the marketing of cotton. Historically, producers had relied on the gin to help them determine the price for a specific lot of cotton. If the farmer wanted a price for his crop, the gin clerk would call two or three cotton buyers, describe the quality characteristics of the farmer's lot of cotton, and ask for bids. Calls were often repeated several times before the producer decided to sell. More often the buyer and seller failed to reach an agreement and this process would have to be repeated many times before a lot was sold. This time consuming and cumbersome process was weighted against the farmer. Because of the time involved in securing bids, only a few buyers could be contacted, thus, bids were subject to the "luck of the draw," reflecting buyer rather than market forces. Also, because the gin received a commission for arranging the sale, there was always the possibility that gins and buyers might collude to set a price that was not fair to the farmer. On the other hand, farmers, interested in knowing what their cotton was worth, would often ask the gin clerks to engage in the lengthy process of securing bids with no real intention to sell. Finally, once the producer and buyer had agreed upon a price, the gin often served as the middleman, paying the producer and delivering title to the buyer. At times, checks from buyers were returned for insufficient funds, the cotton was held in bankruptcy proceedings, and the gin or farmer were left covering the loss.

TELCOT essentially eliminated these problems. Any coop member can now elect to offer his cotton over TELCOT using alternatives similar to trading stocks. At any time, the producer can display all of his lots of cotton with their quality characteristics and quoted market value. Producers and buyers can also see the lots that have recently sold, their quality characteristics, and the price per pound paid by the buyer for the lot. Some farmers have their own personal computers (PCs) to access TELCOT while others prefer to go to the gin where "public" PCs are available. The gin clerk can list a lot or query the system for them. Not only can the farmer assess the value of his cotton immediately, but the value is based on actually trading of cotton as well as world supply and demand considerations rather than any specific buyer's needs. At any time, there are approximately 40 buyers on the TELCOT system, primarily located in Memphis, Tenn.; Dallas and Lubbock, Tex.; and Fresno, Calif. However, through AMCOT, buyers in Japan, South Korea, Taiwan, and several European countries can also purchase PCCA cotton. Under these conditions, collusion is eliminated, thus farmers and buyers alike receive fair market value.

For the buyer, the system provides immediate access to a large portion of the world's available cotton. Where in the past it might have taken weeks to purchase the volume of cotton needed to supply a large textile mill, the buyer can now accomplish this task through TELCOT in minutes. For very large purchases, this allows the buyer to acquire cotton at a price that is relatively unaffected by the knowledge that he needs to purchase a substantial amount of a certain quality of cotton. In 1989, for example, buyers were able to purchase over 385,000 bales of cotton in a single day at the farmers' asking price to primarily fill an order for the People's Republic of China. Over $110,000,000 worth of cotton was traded over TELCOT that day.

PCCA also guarantees all transactions consummated through TELCOT. They ensure that the farmers receives his money and that the buyer gets clear title to the cotton promptly, normally within 24 hours. The buyer, the seller, and the gin are protected from problems that might occur. Extensive audit trails, the threat of being denied access to the system (and therefore, to 15-20 percent of the U.S. cotton crop), and the use of drafts and wire transfers of funds prior to title transfer have eliminated most of the problems associated with cotton transactions. In fact, several other commodity groups including cattle, hogs, grain, coffee, tea and sugar have observed TELCOT and are considering similar systems.

THE TELCOT SYSTEM

TELCOT became a commercial reality in 1975 when remote terminals were installed in 15 cotton buyers' offices in Lubbock and Dallas, Tex., and Memphis, Tenn. The first feature provided by TELCOT was Regular Offer in which buyers bid on a blind basis for cotton entered into the TELCOT computer (analogous to floor trading of stocks). After 15 minutes, the computer closed the bidding and awarded the cotton to the highest bidder provided the price was equal to or above a predetermined minimum set by the producer. There were many advantages to this early TELCOT system. A "lot" of cotton could be purchased quickly on the terminal and all the administrative work was handled by the TELCOT system.

An early enhancement to the TELCOT system, Firm Offer was implemented in 1977. Shown in FIG. 1, this new option allowed producers to offer their cotton to buyers at a firm asking price (analogous to a stock sell order). The offer "good 'til cancelled" remains outstanding until a buyer purchases the lot or it is withdrawn by the producer. The cotton is sold to the first buyer who meets the offer price. Firm Offer has become the most popular option among both producers and buyers.

During periods of low prices, one of the most popular TELCOT enhancements has proven to be the Loan Advance Program (LAP). Producers can tender their cotton to PCCA and receive a cash advance equal to the Commodity Credit Corporation (CCC) loan price, the price guaranteed by the Federal Government. PCCA later offers the cotton over TELCOT to obtain the best price available. In this way, the producer receives an immediate cash advance to help meet short-term financial commitments, and can still profit if the market improves.

Once a producer places cotton in LAP, he can also establish the net (less the advance) equity per bale he desires. TELCOT calculates the loan amount and all charges such as storage and interest in order to offer the cotton at a price to buyers so that the producer nets the desired amount of equity per-bale. TELCOT recalculates these charges every night and adjusts the offering price the next day to net the desired amount to the farmer.

Another feature of TELCOT, Acreage Crop Contracting allows producers to offer their cotton on a forward basis, contracting for the future delivery of cotton at a specific price. A number of different contracting options are available to the producers. However, because PCCA is the ultimate buyer of these acreage contracts, to offset its risk, PCCA usually re-offers these contracts to other buyers or textile mills.

One of TELCOT's most recent innovations is the Automated Counter Offer program. This feature gives buyers a quick and documented means of countering Firm Offers. In this way, buyers unwilling to pay the Firm Offer price can notify gins and producers of the price if they are willing to pay for a particular lot of cotton already offered for sale. This provides producers with additional price discovery.

| ACCOUNT INQUIRY - FIRM OFFER | | | | | | | | | | | | |
|---|---|---|---|---|---|---|---|---|---|---|---|---|
| GIN 50000 | ACCT 0123 | | | *** REG COTTON *** | | | | AREA 4 | | | | (/INQ) |
| | | | | <---AVG. QLTY.---> | | | | | WHSE | <----QUOTE----> | | |
| FNCT PRICE | BYR | FARM | STATUS | LF | CL STP | MIC | STG UNF | | CODE | B/C LRR | PREM | PRICE |
| 4200 | | 60 | FIRM | 43 | 28 295 | 415 | 226 779 | | 886506 | 26 3034 | 0720 | 3754 |
| | | 61 | | 60 | 30 308 | 318 | 278 778 | | 886506 | 11 2235 | 0777 | 3012 |
| | | 62 | | 41 | 27 304 | 444 | 018 066 | | 886506 | 12 3148 | 0720 | 3868 |

FIG. 1: Account Inquiry/Firm Offer Screen

CODES ON THE SCREEN

FNCT—The Firm Offer is initiated by typing the function code "F". Other function codes show more quality detail on bales in the lot.

PRICE—Firm Offer price for this lot (42.00¢ per pound in this example).

BYR—Buyer number, if the Firm Offer is accepted.

FARM—Farm number.

STATUS—The status column will indicate if it is a Firm or Regular Offer.

Quality Characteristics for the lot include: LF—Leaf; CL—Color; STP—Staple; MIC—Micronaire; STG—Strength; and UF—Uniformity.

WHSE CODE—Warehouse code where the cotton is physically located.

B/C—Number of bales in the lot.

LRR—Loan value on this lot (loan repayment rate)

PREM—Premium over the loan rate.

PRICE—Price for this lot.

Automated Counter Offer is also one of the most popular features for buyers because it often results in a transaction that otherwise would not have occurred. An Automated Counter Offer screen is shown in FIG. 2.

TELCOT also allows the cotton buyer to specify only the cotton which he is interested in buying. Each buyer can establish his own individual criteria; e.g., to limit price, specify any quality limits, define warehouse and/or gin location, and crop-year parameters. TELCOT then displays only those lots that meet these criteria. The buyer can also determine whether the lot is in the CCC loan program, and whether the cotton was ginned at a cooperative or independent gin.

Much like a stock broker's ticker-tape, TELCOT also provides all subscribers access to all trades through the Monitor and Monitor Summary function (analogous to the stock market's ticker-tape). This feature displays the sale prices of all trades at all locations to everyone on the system.

The TELCOT system also provides a summary of daily activity, access to futures prices for all major commodities, weather forecasts, and general news. For the gins, PCCA has expanded its services to include an On-Line Gin Accounting OLGA) system. Today, approximately 160 gins subscribe to OLGA. OLGA's significant features include Bale Accounting, General Ledger, Payroll and Financial Statements which augment the more traditional bookkeeping functions.

| | | | /BCM - UYER C/O MAINTENANCE | | | | |
|---|---|---|---|---|---|---|---|
| (/BCM) | | | C/OFFER BUYER MAINTENANCE - 00051 | | | | |
| | OFFER | GIN | TOTAL | OFFER | C/OFFER | C/OFFER | EXPIRE | C/OFFER |
| FC | NO. | NAME | B/C | PRICE | PRICE | TIME | TIME | STATUS |
| — | 1235016 | LYFORD | 1234 | 5400 | 5300 | 1000 | 1100 | ACTIVE |
| | 1235017 | LYFORD | 50 | 5600 | 5500 | 1100 | | WORKING |

FUNCTION: * END OF OFFERS * FC (D=DEL P=UPD R=RCAP E=EQTY X=BOTH M=MESG)

FIG. 2: Buyer Counter Offer Maintenance Screen

CODES ON THE SCREEN

FC—Function code column is used to type a code to provide information on each counter offer.

OFFER NO.—TELCOT Firm Offer number.

GIN NAME—Short name for the gin where the offer originated (Lyford, Tex. in this example).

TOTAL B/C—Number of bales in this lot.

OFFER PRICE—The Firm Offer price of the lot.

C/OFFER PRICE—The Counter Offer price submitted by the buyer.

C/OFFER TIME—The time the Counter Offer was made.

EXPIRE TIME—The time through which the Counter Offer is in effect.

C/OFFER STATUS—Several status states are possible including ACTIVE (offer is open); VOID (offer has been withdrawn by the buyer); ACCEPT offer has been accepted); WORKING (gin acknowledges receipt of the Counter Offer and is attempting to locate the producer for consideration).

```
10/25/89                TELCOT BUYER SELECTION                              /SEL
- - -TYPE SEL- - -      - - - - - -PRICE RANGE- - - - - -   - - AREA - -   COMPANY
  REG INDEX             TELCOT QUOTE ...    5500 THRU 6000  THRU           PCCA
L FRM INDEX             PRODUCER QUOTE ...  5500 THRU 6200                 TELMARK
  FORM G LOAN           EQUITY DOLLARS      THRU
  FORM A LOAN
  NEW CROP              LOT SIZE ...        THRU
  1 YR CROP
  2 YR CROP                4 FIRM LOTS WERE SELECTED
  BROADCAST             - - - - - - - QUALITY RANGE - - - - - - -   WHSE- -SEL   GIN-SEL
  OFF           = = =>LEAF ...       3 THRU 5
                = = =>COLOR ...      2 THRU 6
  (BROADCAST ONLY) =>STAPLE ...     31 THRU 33
  FIRM OFFERS   = = =>MIC ...       35 THRU 49
  REG OFFERS    = = =>STRENGTH ...  21 THRU 25
                = = =>UNIFORMITY ... 78 THRU 82
FUNCTION:
```

FIG. 3 Buyer Selection Screen - Firm Offer Index

CODES ON THE SCREEN

REG INDEX—Selects only lots in Regular Offer.
FRM INDEX—Selects only lots in Firm Offer.
FORM A or G LOAN—Cotton in the CCC loan program may be offered for sale over the TELCOT system; form G Loans are for PCCA members; Form A Loans are for non-members.
CROP YEAR PARAMETERS—Specifies the crop year the buyer wants (NEW, 1 YR OLD, 2 YR OLD).
TELCOT QUOTE—TELCOT price for the lot.
PRODUCER QUOTE—Producers Firm Offer price.
EQUITY DOLLARS—Amount (in dollars) per bale that must be paid by the buyer to gain the right to redeem a bale from the CCC loan program.
LOT SIZE—Range of lot sizes (in bales) the buyer wants to see.
QUALITY RANGE—Buyer can specify particular range of quality characteristics for the cotton.
AREA—Buyer can specify a particular gin area.
GIN-SEL—Buyer can also specify specific gins.
WHSE-SEL—Buyer can specify specific range or warehouse locations.

In 1985 TELMARK, Inc., was founded to provide TELCOT's services to independent gins and their customers. This expansion enabled TELCOT to establish a larger customer base, making the electronic service more cost-effective for growers and buyers alike. TELMARK's growth and acceptance in the independent sector has consistently exceeded expectations.

PCCA leases most of its equipment, including the 3090 mainframe running TELCOT, over 65 gigabytes of DASD, a 3725 front end processor for the network, and some 11,000 miles of telephone lines. A monthly fee is paid to PCCA by both buyers and gin operators for use of their IBM PCs and the communications services. The primary software systems used to support TELCOT are MVS/ESA, CICS, COBOL and IBM's SNA communications products.

THE DEVELOPMENT OF TELCOT AS A STRATEGIC ADVANTAGE

The TELCOT Technology is no longer new but the service and strategy remain state-of-the-art. Cash, McFarlan, and McKenny (1988) were among the first to recognize the relationship between organizational strategy and the effect of information technology (IT).

In some organizations, IT is distinctly supportive in nature, whereas others are strategically dependent upon its effective use. Comparing the strategic impact of the current operations to that expected of the IT application development portfolio, Cash et al. identify four different combinations. Shown in FIG. 4, each of the four different combinations. Shown in FIG. 4, each of the four quadrants represents a different organizational environment for IT depending upon the strategic impact and relevance of the existing systems and those planned as part of the applications development portfolio. Briefly, in the Support quadrant neither the existing nor the proposed systems are expected to directly affect corporate strategy. These organizations are not operationally very dependent on the smooth functioning of IT nor are they strategically dependent on the development of new applications.

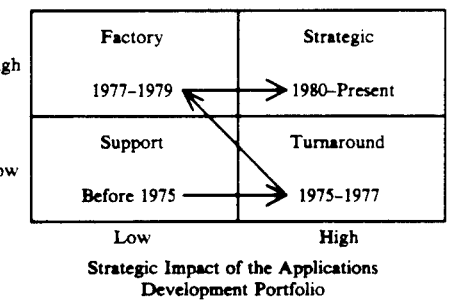

Strategic Impact of the Applications Development Portfolio

FIG. 4: The Strategic Grid and PCCA's Movement Time

The Factory quadrant includes companies that are heavily dependent on the cost-efficient and reliable operation of existing information technology but little effort is spent on the development of new applications. For firms in this quadrant, maintenance of existing applications is the primary concern; the applications development portfolio is not critical to the success of the organization and few new innovative applications are ever considered or undertaken. Conversely, in the Turnaround quadrant the success of the applications development portfolio is essential to the organization's strategic objectives, and the efficient operation of current applications plays a very minor role in the firm's success. Finally, firms in the Strategic quadrant are dependent on both the efficient and uninterrupted operation of existing systems as well as the success of the applications development portfolio. Because of these dependencies, success in the Strategic quadrant requires that a close structural relationship exist between senior corporate and IT management.

Although useful, these Strategic Grid quadrants fail to portray the dynamic nature of this process. A firm's relative dependency on current systems and the success of its application development portfolio varies over time, depending upon such factors as competitors' response, barriers to entry, and other factors. Prior to 1975, PCCA was definitely in the Support quadrant. Their use of IT was limited to data processing primarily for basic accounting functions, and their investment in IT was minimal, viewing neither the efficient operation of existing applications nor the development of new applications as critical to the overall success of the cooperative. From the Support quadrant, PCCA moved to the Turnaround quadrant in 1975. The impact of the existing accounting applications on PCCA's strategy had an extremely low priority, while the survival of the firm was almost totally dependent upon the successful development of the TELCOT application development portfolio. During the first few years of operation (1975-1977), PCCA's management not only had to develop the portfolio of applications but also market the concept and system to producers, buyers, and gin operators. In the first year of operations, $26 million dollars in cotton (123,000 bales), were traded through TELCOT. In the second year, 280,000 bales were traded through the system with a value of $83 million dollars. By 1977, TELCOT was a success, trading more than three-quarters of a million bales with a value of $167 million dollars. At this point PCCA's use of TELCOT moved them into the Factory quadrant.

Following the successful implementation of TELCOT, for the next few years (1977-1979) very little application development was undertaken and few new enhancements were introduced. Characteristic of the Factory quadrant, PCCA became dependent on TELCOT, concentrating their efforts on its efficient operation. Because of the high strategic importance of TELCOT, operating problems because crises. Having to deal with 35 different telephone companies and the problems associated with older circuit switching equipment prevalent in rural areas meant that many of these crises involved telecommunication problems. The "Factory" importance of TELCOT made it necessary for PCCA to develop their own systems to detect transmission line problems. As PCCA constantly monitors their own transmissions, they are typically the first to know of problems and can often tell the local carrier the exact location of the problem.

In 1979, Dan Davis, the initiator of TELCOT, left PCCA to start to a competitive firm. Two other first also started electronic marketing systems for cotton at about the same time. For the first time, TELCOT was facing competition. It no longer provided a unique service. To meet this challenge, PCCA looked to its application development portfolio for continued competitive advantages. In terms of the Cash et al. (1988) model, this response to competition moved PCCA from the Factory to the Strategic quadrant where they remain today (1980-present). In the past decade their application development portfolio has produced such innovations as an On-Line Gin Accounting system, the automation of counter offers, an electronic news and weather service, and many others. To assure a consistent, high quality product, PCCA also developed a program to computer "select" and "blend" cotton for their denim plant.

Some of the most recent developments have greatly increased the effectiveness of the TELCOT system. To overcome the poor quality associated with data transmission over telephone lines in remote areas, one of these developments involves the use of data transmission via FM radio in the UHF band. This system was piloted last year and is now in place in over 100 of PCCA's 200 gins. Two-way satellite data transmission is also used by some of the gins that are in remote areas where neither leased lines nor FM radio waves are cost effective as a means of data transmission.

A second development is the implementation of an Electronic Title System. This is similar to an electronic funds transfer system, because the warehouse receipt (one for each bale of cotton) is a legal negotiable document. Because of PCCA's application development experience and current operations, building the system has proven far less challenging than gaining acceptance by users for an electronic warehouse receipt. However, electronic warehouse receipts have been successfully piloted at one warehouse and they will be implemented across the entire system by fall 1990. At that time, 95 percent of the bales processed by PCCA will utilize electronic warehouse receipts and the electronic title system.

Another application is the use of bar codes on each bale for logistical and accounting applications. Electronic Data Interchange to facilitate the efficient transport of information from the warehouses to the textile mills was implemented over the last couple of years. To enable the gins to use the On-Line Gin Accounting system when PCCA's mainframe is not available, a PCCA employee, Stu Childre, developed a PC version of CICS that runs under OS/2. This allows CICS applications to be downloaded to the gins' PC without rewriting programs so that they can operate the accounting system even when PCCA's mainframe is unavailable. This PC version of CICS works so well that IBM has purchased all rights to the system and is marketing it under its own brand name as CICS OS/2. Under development is a TELCOT marketing alternative that will allow producers to purchase cotton options; i.e., puts or calls, as hedges to their actual cotton production.

CRITICAL MANAGEMENT ISSUES

Although few of the current hardware and software technologies employed by PCCA are cutting edge, the strategic use of these technologies to achieve organizational objectives is probably unique for an organization of this size in the agricultural sector of the economy. Collectively, this case illustrates three important points about the strategic use of IT. First, given innovative management, IT can be successfully applied in any organization regardless of size, type of business, and geographic locale. Second, an organization's dependence on IT changes quadrants over time as their environment, management, and goals change. Third, it's not the technology but the strategic use of the technology to achieve organizational objectives that is important.

As PCCA has shown, innovative management can achieve significant strategic positions using established technology. In fact, the use of cutting edge technology may only increase the risk. For example, modern imaging and telecommunications technology were blended to support Federal Express's ZapMail, which was essentially a facsimile service. In this instance, this new service was not successful, in part because Federal Express was not prepared to market the service and in part because facsimile equipment declined so rapidly in price that even the smallest organizations soon acquired their own machines (Keller and Wilson, 1986).

When the technology alone is the product, the risk of obsolescence is always present regardless of the application. Simply applying new technology is no guarantee of success, a strategy developed by top management that leverages the technology must also be in place. A committed and informed executive sponsor is often a prerequisite for the successful development and implementation of new information technology. As a prerequisite, the executive must know the needs of the business and have a realistic understanding of the capabilities and limitations of technology. In many cases, they must also be willing to champion the system, spending considerable time and energy guiding its development. Mr. Davis was the executive sponsor for TELCOT. To leverage the time of the executive sponsor, it is often desirable to have an operating sponsor who is designated to manage the details of the implementation (Rockart and DeLong, 1988). Darryl Lindsey is the operating sponsor for TELCOT. The executive sponsor initiates and drives the system into existence. Either the executive or his operating sponsor stays on top of the system's development, providing direction and feedback about the proposed application, and communicating a strong and continuing interest to those who have or will have a stake in the system, such as key staff and the line managers involved in the project.

TELCOT is a marketing success unequaled in the history of the agricultural industry. Over 14 million bales of cotton have traded over the system since its inception. PCCA has continued to enhance the TELCOT system to satisfy the needs of the buyers, sellers, and gin operators. Producers wanted more flexibility in marketing options, greater market information and guaranteed payment. Buyers wanted a more comprehensive description of the cotton offered, the ability to buy large volumes faster, to maintain a running tally of their purchases and guaranteed delivery of their cotton. TELCOT met both the buyer's and seller's needs. This legacy of innovation and creativity continues today as a satellite communication system has been installed at 7 gins and 2 buyer locations for data (and potentially voice) transmission. Two-way radio links recently have become economically attractive alternatives to leased telephone lines in some locations and are now being utilized at over 100 gin locations. Both of these approaches are more reliable and less expensive than leased analog lines. Also, personal computers have recently been integrated into the TELCOT communication system allowing farmers to conduct some transactions from their homes, if they desired. PCCA developed the Electronic Title System which has replaced the industry standard paper warehouse receipts. PCCA continues to evaluate and implement information technology to enhance TELCOT and maintain its reputation as "The Window of the Marketplace."

SUMMARY AND CONCLUSIONS

PCCA's experience over the last fifteen years with TELCOT demonstrates that relatively small organizations can use information technology for competitive advantage. TELCOT drastically changed the nature of PCCA's business, transforming their operations from that of a merchant to include brokerage. In so doing, PCCA better served its clientele and also assured its future as an organization. TELCOT is a major factor in PCCA's growth from a $50 million to a $500 million dollar a year enterprise.

By tracing the strategic impact of TELCOT, this case dramatically illustrates the transition from the Support to the Strategic quadrant. TELCOT moved PCCA from the Support quadrant (Before 1975), through the Turnaround (1975-1977) and Factory quadrants (1977-1979) and eventually into the Strategic quadrant (1980-present) of the Cash et al. (1988) grid. Today both the efficient operations of current TELCOT systems and the continued success of the application development portfolio are essential to PCCA's survival. PCCA is committed to the Strategic quadrant and as such must continue to invest heavily in information technology to stay ahead of their competition and continue to be of service to their membership.

REFERENCE

Cash, J. I. Jr., and McLeod, P. L. "Managing the Introduction of Strategic Information Systems Technology," Harvard University Graduate School of Business, HBS working Paper, 1984.

Cash, J. I. Jr., McFalan, F. W., and McKenny, J. L. *Corporate Information Systems Management: The Issues Facing Senior Executives*, Richard D. Irwin, Inc. Homeword, Ill., 1988.

Chester, J. "EDI: Not Just a Giants' Game," *Infosystems*, January, 1988, pp. 19-22.

Keller, J. J. and Wilson, J. W. "Why ZapMail Finally Got Zapped," *Business Week*, Oct. 13, 1986, pp. 48-49.

Manis, R. A. "Over-the-Counter Culture," Inc., March, 1987, p. 13.

Meyer, N. D. and Boone, M. E. *The Information Edge*, McGraw Hill, 1987.

Porter, M. E. and Miller, V. E. "How Information Gives You Competitive Advantage," *Harvard Business Review*, July-August, 1985, pp. 149-161.

Rockart, J. F. and DeLong, D. W. *Executive Support Systems*, Dow Jones-Irwin, Homewood, Ill., 1988.

Sliwoski, L. "Online Commercial Services: Small Business Organizations," *Small Business News and Views*, July, 1976, pp. 77-79.

Sullivan, J. J. and Shively, G. O. "Expert Systems Software In Small Business Decision Making," *Journal of Small Business Management*, January, 1987, pp. 17-27.

What is claimed is:

1. A method for carrying out computerized trading of goods, comprising the steps of:
   storing in a centralized data base of a computer system information unique to at least one type of goods of a seller, the goods of the type each being distinct and different from each other and the information stored in the computer provides distinguishing characteristics of each of the individual goods of the seller;
   in response to a command input into the system by a seller, visually displaying and making available to the seller of the goods a listing of the goods owned by an owner of the goods;

receiving an indication by the computer system of the identity of a subset of the listing, the subset defining the goods desired to be sold by the seller;

in response to a command input into the system by a buyer, visually displaying to the buyer a screen display of information that is unique to the goods of the subset identified by the seller as being for sale;

receiving an indication by the computer system of the identity of one or more of the goods of the subset desired to be purchased by the buyer;

preventing by the computer system the one or more goods of the subset identified by the buyer and agreed to be purchased from being shipped by the owner or made available for purchase by a second buyer to thereby prevent the identified goods from being sold twice; and updating the data base to reflect a buyer ownership of the particular goods purchased by the buyer, said updating of the data base of new ownership being carried out after payment for the particular goods by the buyer.

2. The method of claim 1, further including receiving an indication by the computer system from the buyer based upon a selection by the buyer of a type of title by which the purchased goods are to be transferred.

3. The method of claim 2, further including writing in the data base in a titled field digital characters that constitute an electronic title to the goods.

4. The method of claim 3, further including causing a documentary type of title, if any, to the goods to be physically canceled before writing the data base title field with the electronic title.

5. The method of claim 3, further including providing capabilities for assigning documentary and electronic titles to specific goods, but preventing both a documentary and electronic title to be assigned at the same time to the specific goods and thus prevent separate selling transactions of the specific goods at the same time.

6. The method of claim 1, further including associating a flag with each of the goods of the subset subject to the sale, showing that payment for the goods is pending.

7. The method of claim 1, wherein said goods define cotton bales, and further including storing in the computer data base information unique to each bale of cotton, and wherein when the buyer identifies a bale of cotton for purchase, that particular bale of cotton identified is subject to purchase.

8. A method for carrying out transactions of titled goods, comprising the steps of:

assigning in a data base an electronic title to the titled goods, said electronic title being an exclusive type of title carrying rights of ownership of the titled goods;

storing in the data base information associated with the titled goods, including a loan status and an owner thereof;

in response to a request for a loan in which the titled goods represent collateral, interrogating the data base by a computer to determine the loan status of the titled goods, and if the titled goods are not indicated in the data base as being collateral for a previous loan, causing a check to be issued; and updating the loan status of the titled goods subject to the loan to indicate that the titled goods are the subject of the loan.

9. The method of claim 8, further including providing a centralized trading computer system having said computer, said data base and a plurality of computer terminals, said computer being programmed to carry out trading transactions in which the titled goods are purchased and sold, and programmed to carry out loan transactions related to the titled goods.

10. The method of claim 9, further including causing said trading computer system to print checks in response to authorized loan transactions.

11. In a computerized commodity trading system, a method for associating a commodity with a title, comprising the steps of:

for each individual commodity of a type of commodity entered into the trading system, creating a data base commodity record identifying the individual commodity, and assigning in a field associated with the data base commodity record an indication that an electronic type of title is associated with the individual commodity; and for a group of individual commodities entered into the trading system that are to be traded as a block transaction, creating a block record in the data base identifying the block of individual commodities, and assigning in a title field in the block record an indication that an electronic type of title is associated with the block of individual commodities.

12. The method of claim 11, further including in the commodity record and the block record, a title field for identifying whether the individual commodity and the block of goods is to be represented by an electronic type of title or a documentary type of title, and further including the step of writing the title field with an indication of a documentary type of title or an electronic type of title.

13. The method of claim 11, further including ascertaining by said trading system during a sale transaction whether a block of said commodities are to be traded, and if so, versifying that all the commodities associated with the block are all subject to the transaction.

14. The method of claim 13, further including causing a single documentary title to be created, the documentary title representing title to the entire block.

15. The method of claim 14 further including changing respective fields of the individual commodity records and the block record to reflect the documentary type of title.

16. The method of claim 15, further including allowing only one of a documentary title or an electronic title to exist so as to preclude transactions of the block of goods to be carried out concurrently with different types of titles.

17. In a computerized commodity trading system, a method for carrying out loan transactions of a commodity, comprising the steps of:

associating a block of commodities to be the subject of a loan;

assigning to the block of commodities an electronic type of title so that a documentary type of title is not involved in the loan transaction; and carrying out the loan transaction, including passing an indication of the electronic type title associated with the block of commodities to a lending institution for security for the loan.

18. The method of claim 17, further including creating a block record in a data base of the trading system, said block record being uniquely associated with the block of commodities, and said block record having a field identifying a type of title associated with the block of commodities.

19. The method of claim 17, further including creating a commodity record in a data base of the trading system, each said commodity record being uniquely associated with one said commodity, and said commodity record having a field identifying a type of title associated with the respective commodity.

20. The method of claim 17, further including, in response to a request for a loan transaction, ascertaining that all commodities of the block are subject to the same loan transaction.

21. A system for trading a commodity, comprising:
a program-controlled computer;
a data base having a file accessible by said computer in response to a transaction involving a quantity of commodities defining a block, said file having a block record uniquely identifying each commodity of the block, and a title field storing data indicating whether the block of commodities is represented by a block electronic title or by a block documentary title; and
said computer being programmed to respond to a trading transaction for accessing the title field to determine a type of block title carried by said block of commodities and to change the data in the title field and thereby change the type of block title in response to a change in ownership of the block of commodities.

22. A system of claim 21, wherein said title field is structured to store at any one time an indication of a type of block title that is mutually exclusive as to other types of titles, and wherein said computer is programmed to access a single title field in said block record such that duplicate block titles cannot be issued with respect to the block of commodities.

23. The system of claim 22, wherein an indication of an electronic title stored in said title field constitutes legal title to the block of commodities.

24. A method for carrying out a transaction involving a block of titled goods, comprising the steps of:
storing data in a computer data base that is associated with the block of goods, including data indicating a type of block title assigned to the block of goods;
accessing the data base in response to a transaction involving the block of goods to determine the type of block title assigned thereto; and
providing a legal documentary type of block title for the block of goods if the data base data indicates such a type of title, and maintaining a software indication of a block title if said data base indicates an electronic type of title.

25. The method of claim 24, further including providing a capability of changing from a documentary type of title to an electronic type of title, and vice versa, with respect to the block of goods.

26. A method for carrying out a transaction involving a block of goods, comprising the steps of:
associating a group of goods in a data base to define the block of goods;
assigning an electronic title to the block of goods, said electronic title carrying with it rights of ownership to the block of goods; and
carrying out a trading transaction of said block of goods by transferring a single electronic representation of title associated with said goods.

27. The method of claim 25, further including carrying out the trading transaction in a computerized system, and preventing a documentary type of title to the block of goods to be made available by the system when the block of goods is represented in the data base with an electronic type of title.

* * * * *

UNITED STATES PATENT AND TRADEMARK OFFICE
CERTIFICATE OF CORRECTION

PATENT NO. : 5,285,383
DATED : February 8, 1994
INVENTOR(S) : Lindsey, et al.

It is certified that error appears in the above-indentified patent and that said Letters Patent is hereby corrected as shown below:

Column 41, claim 3, line 27, delete ""titled", insert --title--.

Column 43, claim 22, line 30, delete "A", insert --The--.

Signed and Sealed this

Eighteenth Day of October, 1994

Attest:

BRUCE LEHMAN

*Attesting Officer*  *Commissioner of Patents and Trademarks*